(12) United States Patent
Ueno

(10) Patent No.: US 12,526,521 B2
(45) Date of Patent: Jan. 13, 2026

(54) AUTOMATIC FOLLOWING AND IMAGE BLUR CORRECTION OF A SUBJECT

(71) Applicant: CANON KABUSHIKI KAISHA, Tokyo (JP)

(72) Inventor: Ryohei Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/321,948

(22) Filed: May 23, 2023

(65) Prior Publication Data

US 2023/0403466 A1 Dec. 14, 2023

(30) Foreign Application Priority Data

Jun. 9, 2022 (JP) ................. 2022-093932

(51) Int. Cl.
| | |
|---|---|
| *H04N 23/68* | (2023.01) |
| *H04N 23/60* | (2023.01) |
| *H04N 23/61* | (2023.01) |
| *H04N 23/63* | (2023.01) |
| *H04N 23/695* | (2023.01) |

(52) U.S. Cl.
CPC .......... *H04N 23/682* (2023.01); *H04N 23/61* (2023.01); *H04N 23/633* (2023.01); *H04N 23/64* (2023.01); *H04N 23/695* (2023.01)

(58) Field of Classification Search
CPC .... H04N 23/682; H04N 23/61; H04N 23/633; H04N 23/64; H04N 23/695; H04N 23/611; H04N 23/684; H04N 23/72; H04N 23/667; H04N 23/672; H04N 23/6812; H04N 23/6815; H04N 23/73; H04N 23/76

See application file for complete search history.

(56) References Cited

U.S. PATENT DOCUMENTS

| | | | |
|---|---|---|---|
| 9,635,265 B2 | 4/2017 | Mukunashi | |
| 2003/0174902 A1* | 9/2003 | Barkan | H04N 25/48 382/284 |
| 2016/0028958 A1* | 1/2016 | Tsuchiya | H04N 23/6815 348/208.4 |

(Continued)

FOREIGN PATENT DOCUMENTS

JP 2015-152888 A 8/2015

*Primary Examiner* — Mekonnen D Dagnew
(74) *Attorney, Agent, or Firm* — Cowan, Liebowitz & Latman, P.C.

(57) ABSTRACT

An image capturing apparatus is provided with an apparatus shake detection unit, an apparatus movement detection unit, a plurality of rotation units, and a lens barrel rotation driving unit. The image capturing apparatus detects subject information, and changes the image capturing direction of the image capturing unit by performing driving control of the rotation unit based on the detected subject information, and performs tracking control of the subject and control of image blur correction. A control unit calculates the following degree of tracking with respect to the subject, and performs control to change one or more among the sensitivity of following degree and the exposure condition of the image capturing unit based on at least one of blur information acquired from the following degree, driving information in the lens barrel rotation driving unit, and a shake amount of the image capturing apparatus.

17 Claims, 27 Drawing Sheets

(56) References Cited

U.S. PATENT DOCUMENTS

2016/0173765 A1\* 6/2016 Shimizu ................ H04N 23/61
　　　　　　　　　　　　　　　　　　　　　　348/222.1
2016/0182814 A1\* 6/2016 Schwesinger ........ H04N 23/661
　　　　　　　　　　　　　　　　　　　　　　348/14.03

\* cited by examiner

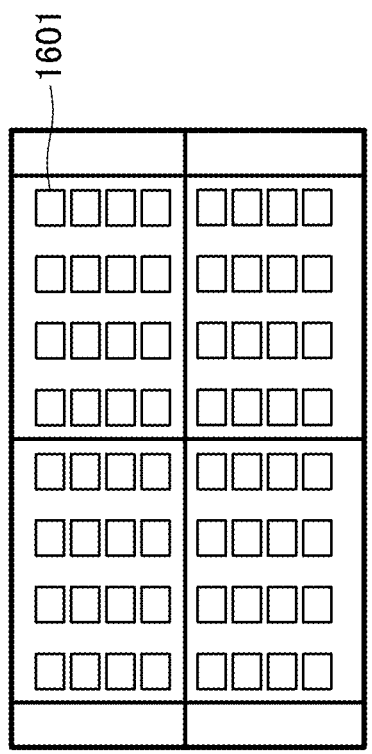
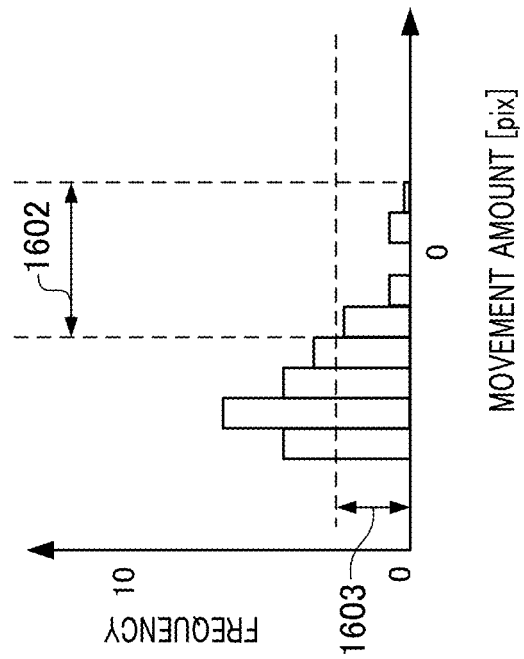
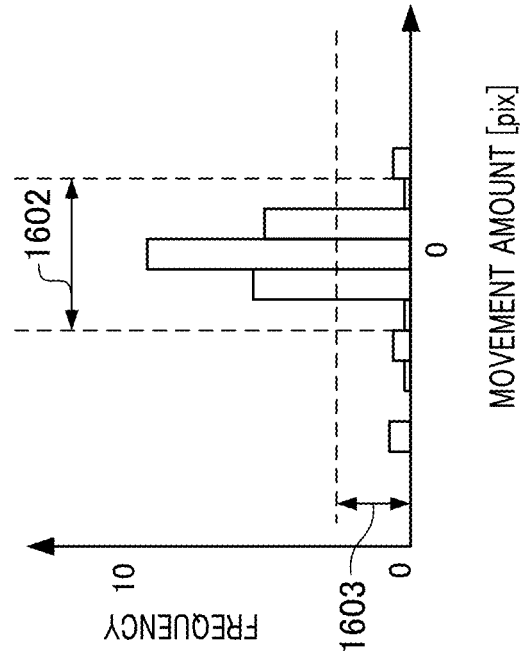

FIG. 17

| AREA | PRESENT TIME TO TIME T1 | TIME T1 TO TIME T2 | TIME T2 TO TIME T3 | TIME T3 TO TIME T4 | ... |
|---|---|---|---|---|---|
| Area1 | 0 OF IMAGES | 0 OF IMAGES | 0 OF IMAGES | 2 OF IMAGES | |
| Area2 | 1 OF IMAGES | 1 OF IMAGES | 1 OF IMAGES | 0 OF IMAGES | |
| Area3 | 3 OF IMAGES | 4 OF IMAGES | 2 OF IMAGES | 0 OF IMAGES | |
| Area4 | 2 OF IMAGES | 2 OF IMAGES | 1 OF IMAGES | 0 OF IMAGES | |

| INDIVIDUALLY REGISTERED SUBJECT | PRESENT TIME TO TIME T1 | TIME T1 TO TIME T2 | TIME T2 TO TIME T3 | TIME T3 TO TIME T4 | ... |
|---|---|---|---|---|---|
| Asan | 3 OF IMAGES | 2 OF IMAGES | 0 OF IMAGES | 0 OF IMAGES | |
| Bsan | 1 OF IMAGES | 2 OF IMAGES | 1 OF IMAGES | 0 OF IMAGES | |
| Csan | 0 OF IMAGES | 0 OF IMAGES | 1 OF IMAGES | 4 OF IMAGES | |
| Dsan | 3 OF IMAGES | 0 OF IMAGES | 0 OF IMAGES | 0 OF IMAGES | |

| REGISTERED OBJECT SUBJECT | PRESENT TIME TO TIME T1 | TIME T1 TO TIME T2 | TIME T2 TO TIME T3 | TIME T3 TO TIME T4 | ... |
|---|---|---|---|---|---|
| DOG | 2 OF IMAGES | 1 OF IMAGES | 0 OF IMAGES | 0 OF IMAGES | |
| CAT | 0 OF IMAGES | 0 OF IMAGES | 1 OF IMAGES | 0 OF IMAGES | |

| SCENE | PRESENT TIME TO TIME T1 | TIME T1 TO TIME T2 | TIME T2 TO TIME T3 | TIME T3 TO TIME T4 | ... |
|---|---|---|---|---|---|
| BLUE SKY | 0 OF IMAGES | 0 OF IMAGES | 2 OF IMAGES | 2 OF IMAGES | |
| EVENING SKY | 2 OF IMAGES | 0 OF IMAGES | 0 OF IMAGES | 0 OF IMAGES | |
| NATURAL VERDURE | 0 OF IMAGES | 0 OF IMAGES | 1 OF IMAGES | 4 OF IMAGES | |
| EVENING VIEW | 0 OF IMAGES | 0 OF IMAGES | 0 OF IMAGES | 0 OF IMAGES | |

⋮

2201

AUTOMATIC FOLLOWING AND IMAGE BLUR CORRECTION OF A SUBJECT

BACKGROUND OF THE INVENTION

Field of the Invention

The present invention relates to a technology for automatic following and image blur correction of a subject.

Description of the Related Art

A method of suppressing image blur of a subject image when capturing an image of a moving body (hereinafter, also referred to as a "moving subject") includes a first method of increasing shutter speed, and a second method of moving a camera by a photographer so as to match the motion of the moving subject during exposure. In the second method, because subject information cannot be detected during the exposure, image blur correction is performed by predicting the movement of the subject during exposure from the subject information before the exposure. However, it is necessary to respond to changes in the velocity and traveling direction of the moving subject during exposure. For example, in a case in which image blur correction is not properly performed on an irregularly moving subject, there is a possibility that an image with significant image blur will be acquired. Japanese Patent Application Laid-Open No. 2015-152888 discloses a method for predicting the motion of a subject during exposure from the subject information prior to exposure, and for performing image capture after the motion of the subject has stabilized.

In the prior art, in a case in which it takes time for the motion of a moving subject to stabilize when capturing an image of a moving subject where motion is difficult to predict, such as an irregularly moving subject, there is a possibility that there is a case in which image capturing cannot be performed at any time, or that the opportunity for capturing an image may be lost.

SUMMARY OF THE INVENTION

The purpose of the present invention is to provide an image capturing apparatus that is capable of performing following control of a subject and acquiring an image in which image blur has been suppressed.

An image capturing apparatus according to an embodiment of the present invention is provided with an image capturing unit configured to capture an image an image of a subject, a first detection unit configured to detect subject information, a second detection unit configured to detect a shake amount of the image capturing apparatus, a driving unit configured to change an image capturing direction of the image capturing unit, and a control unit configured to perform following control in which the image capturing direction is followed with respect to the subject by the control unit and control of image blur correction by using the subject information and the detected information of the shake amount, and control to change an exposure condition of the image capturing unit. The control unit is configured to calculate a control amount of the driving unit and driving information, and the following degree and sensitivity of the following control, and performs control so as to change at least one of the sensitivity and the exposure condition during an exposure period of the image capturing unit, which is determined by at least one of the blur information, the driving information, and the shake amount that is acquired from the following degree.

Further features of the present invention will become apparent from the following description of exemplary embodiments with reference to the attached drawings.

BRIEF DESCRIPTION OF THE DRAWINGS

FIG. 16A to FIG. 16C are diagrams for explaining motion detection of a captured image.

FIG. 17 is an explanatory diagram relating to the management of the number of captured images for each area.

FIG. 18 is an explanatory diagram relating to the management of the number of captured images of each registered subject that has been individually authenticated.

FIG. 19 is an explanatory diagram relating to the management of the number of captured images of each registered subject that has been recognized as an object.

FIG. 20 is an explanatory diagram relating to the management of the number of captured images for each scene.

DESCRIPTION OF THE EMBODIMENTS

A preferred embodiment of the present invention will be described in detail with reference to the accompanying drawings. In an embodiment, an example of an image capturing apparatus (hereinafter also referred to as a "camera") having a panning mechanism and a tilting mechanism is shown. The image capturing apparatus includes a search function and a following function of a subject, and a correction function for image blur (hereinafter simply referred to as "blur") caused by shaking or the like. It should be noted that panning is referred to as "pan", and tilting is referred to as "tilt" for the sake of brevity.

Figure 1A:
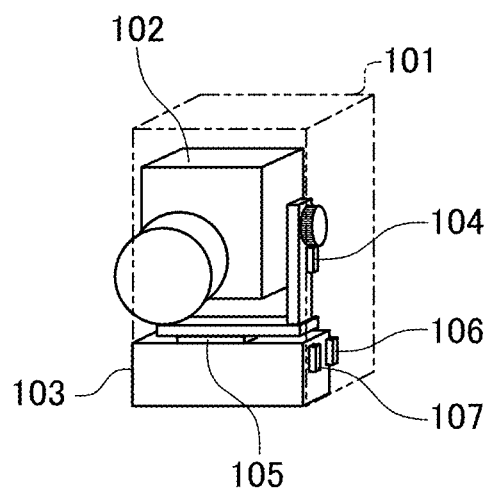
FIG. 1A and FIG. 1B are diagrams schematically showing an image capturing apparatus and a definition of axes.

FIG. 1A is a diagram schematically showing an image capturing apparatus according to an embodiment. A camera 101 is provided with a power supply switch, a camera operating member, a lens barrel 102, and a fixed unit 103. The lens barrel 102 includes a lens group, a diaphragm, an image capturing element, and the like that configure an image capturing optical system. The camera 101 includes a mechanism unit capable of rotationally driving the lens barrel 102 with respect to the fixed unit 103.

Figure 1B:
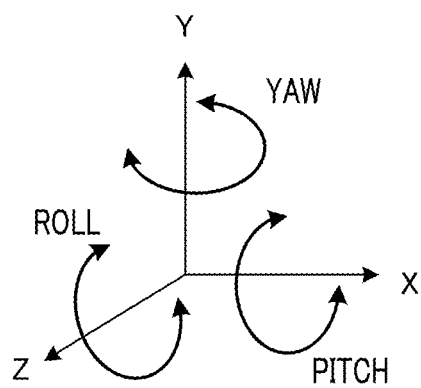

FIG. 1B is an explanatory diagram of the axes definitions in a three-dimensional orthogonal coordinate system that is set in the fixed unit 103. A pitch direction in which the X-axis is the rotation center axis, a yaw direction in which the Y-axis is the rotation center axis, and a roll direction in which the Z-axis is the rotation center axis are shown.

The camera 101 is provided with a first unit (pan rotation unit) that configures a panning mechanism and a second unit (tilt rotation unit) that configures a tilting mechanism. A pan rotation unit 105 includes a motor driving mechanism unit capable of rotating the lens barrel 102 in a yaw direction shown in FIG. 1B. A tilt rotation unit 104 includes a motor driving mechanism unit capable of rotating the lens barrel 102 in a pitch direction shown in FIG. 1B. An angular velocity meter 106 and an acceleration meter 107 are both mounted on the fixed unit 103. The angular velocity meter 106 detects the angular velocity of the shake of the camera 101, and the acceleration meter 107 detects the acceleration of the shake of the camera 101.

Figure 2:
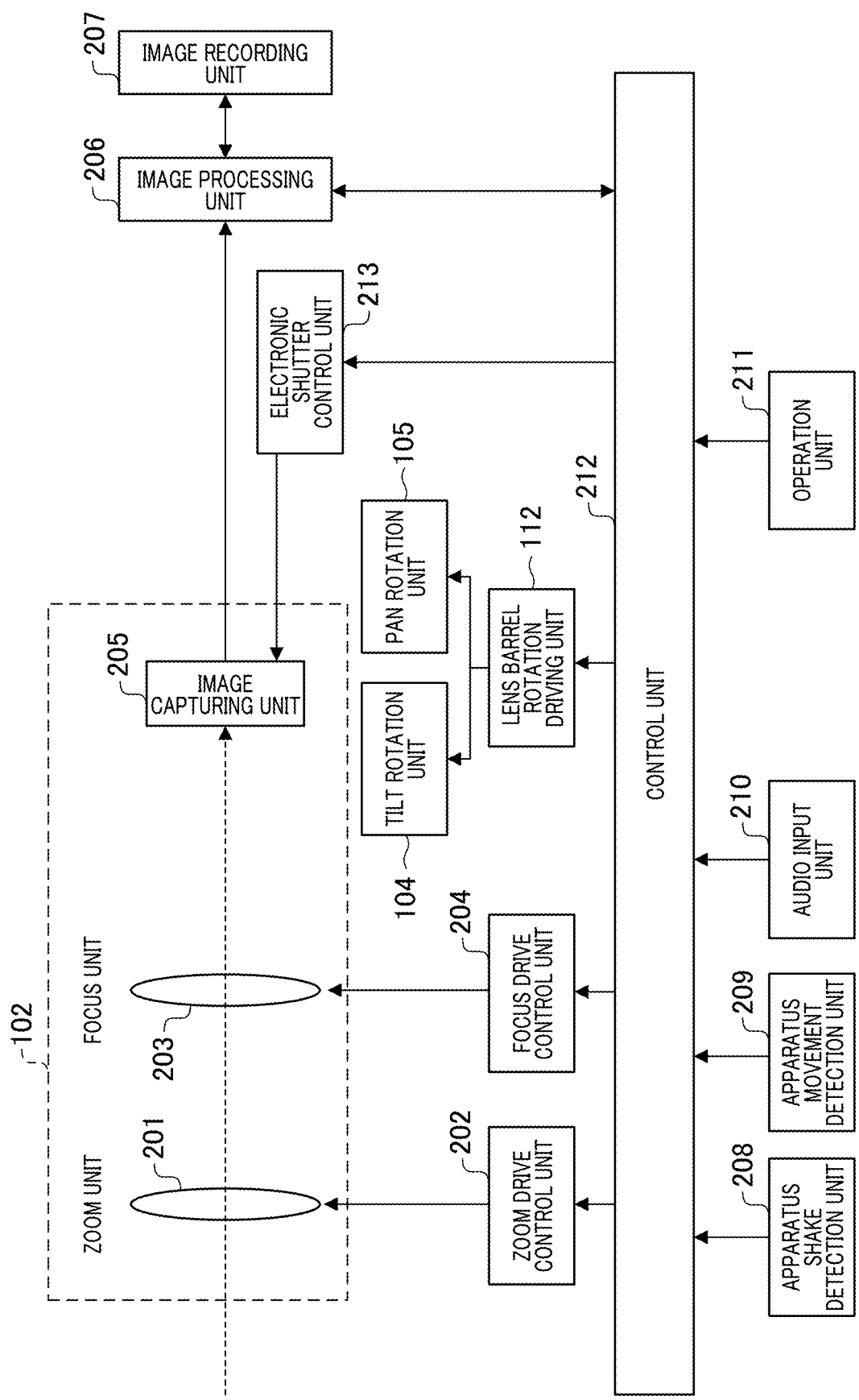
FIG. 2 is a diagram showing a configuration of the image capturing apparatus.

A configuration of an image capturing apparatus that includes an automatic subject search function will be explained with reference to FIG. 2. FIG. 2 is a block diagram showing an example configuration of the camera 101. The lens barrel 102 is provided with a zoom unit 201, a focus unit 203, and an image capturing unit 205.

The zoom unit 201 includes a zoom lens that performs variable magnification. The focus unit 203 includes a focus adjustment lens. The image capturing unit 205 includes an image capturing element.

A zoom driving control unit 202 performs driving control of the zoom unit 201, and detection of the current position of the zoom lens. A focus driving control unit 204 performs driving control of the focus unit 203, and detection of the current position of the focus lens. The zoom driving control unit 202 and the focus driving control unit 204 each perform driving control in accordance with a control command from a control unit 212 described below.

In the image capturing unit 205, an imaging element receives light from a subject incident through the imaging optical system, and outputs information about a charge corresponding to the amount of received light as analog image data to an image processing unit 206. The image processing unit 206 performs analog-to-digital (A/D) conversion on the analog image data from the image capturing unit 205, and generates digital image data. The image processing unit 206 applies image processing, such as distortion correction, white balance adjustment, and color interpolation processing, and then outputs the digital image data. An image recording unit 207 converts the digital image data output from the image processing unit 206 into a recording format, such as a Joint Photographic Experts Group (JPEG) format. The image recording unit 207 records the converted data on a recording medium such as a non-volatile memory.

A lens barrel rotation driving unit 112 drives the tilt rotation unit 104 and the pan rotation unit 105. That is, the lens barrel 102 can be driven in the tilting direction and the panning direction. An apparatus shake detection unit 208 is provided with the angular velocity meter 106 and the acceleration meter 107. The angular velocity meter 106 is a gyro sensor that detects the angular velocity in the three axial directions of the image capturing apparatus. The acceleration meter 107 is an acceleration sensor that detects the acceleration in the three axial directions of the image capturing apparatus. The apparatus shake detection unit 208 outputs each of a detection signal of the angular velocity and the acceleration to a control unit 212 described below. A computation of the rotational angle or shift amount of the image capturing apparatus can be performed based on the detected signal.

An apparatus movement detection unit 209 detects movement of the image capturing unit by using location information obtained by a Global Positioning System (GPS) or by using a movement detection unit such as an acceleration sensor. For example, the GPS unit is provided on the camera 101, and the camera 101 obtains location information detected by an external GPS detection unit via communication. It should be noted that although the apparatus shake detection unit 208 is capable of detecting the shift amount (movement amount) of the image capturing unit by the acceleration meter 107, it is difficult to detect a large movement amount due to the characteristics of the acceleration meter 107. Thus, a movement within a relatively small range of movement is detected by the apparatus shake detection unit 208, and a movement having a relatively large movement amount is detected by the apparatus movement detection unit 209. The apparatus movement detection unit 209 outputs a detection signal to a control unit 212 described below.

An audio input unit 210 acquires an audio signal from a microphone provided on the image capturing apparatus, and outputs the audio signal to the operation unit 212 described below. An operation unit 211 is provided with a power button that is an operation member for the user, and a button for changing settings of the camera and the like. When the power button is operated, power is supplied to the entire image capturing system according to the intended use, and the camera 101 is activated. The operation unit 211 receives a user operation instruction, and outputs an operation signal to the control unit 212 described below.

The control unit 212 controls the entire image capturing system. The control unit 212 is provided with a Central Processing Unit (CPU), for example, and performs various processing by executing a control program. An electronic shutter control unit 213 performs control of the electronic shutter with respect to the image capturing unit 205 and sets the ISO sensitivity value and the like, based on exposure conditions in accordance with a control command from the control unit 212.

Figure 3:
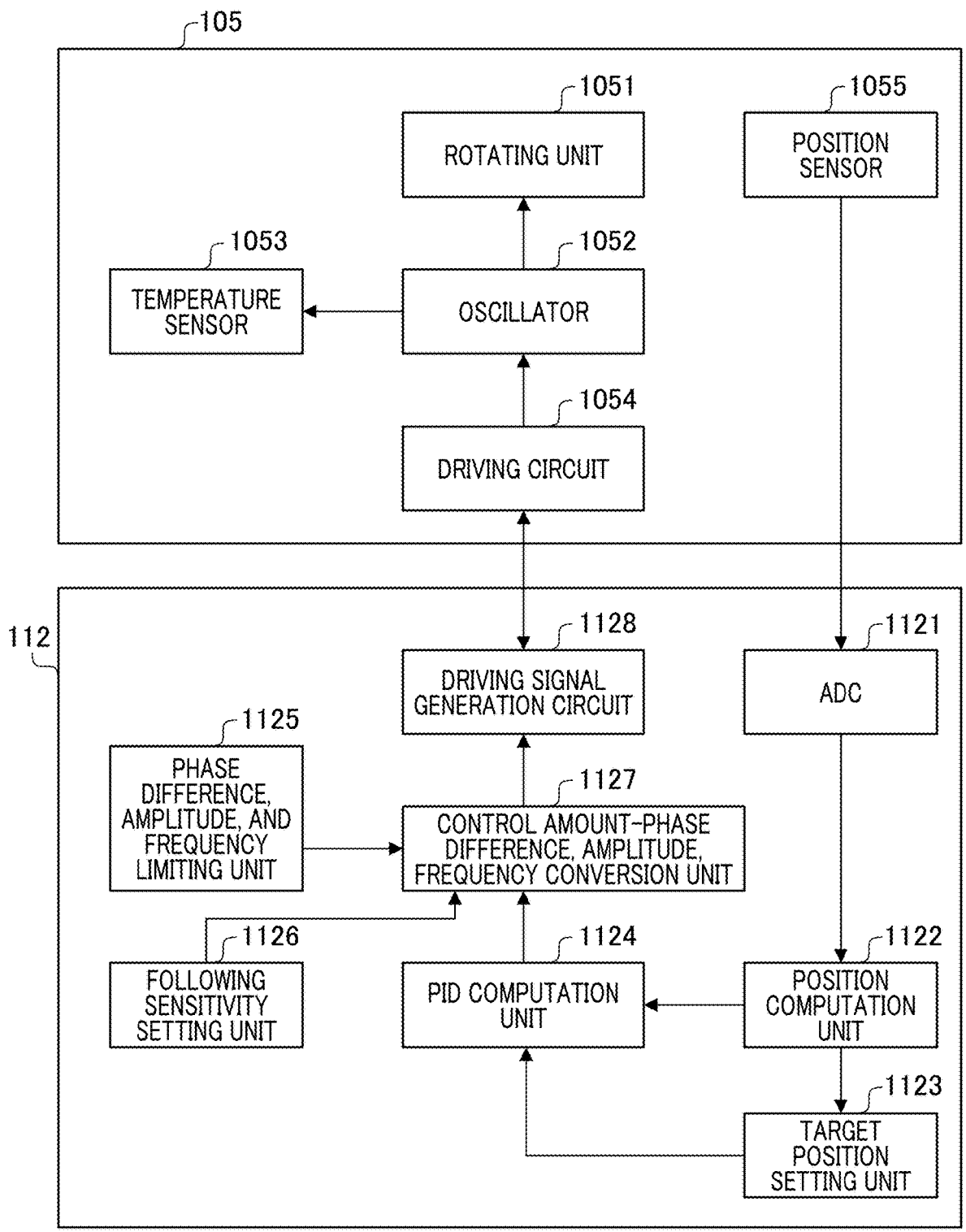
FIG. 3 is a configuration diagram of a rotation unit and a lens barrel rotation driving unit.

FIG. 3 is a block diagram showing an example configuration of the pan rotation unit 105 and lens barrel rotation driving unit 112. Because the tilt rotation unit 104 has a similar configuration to that of the pan rotation unit 105, except that the drive shaft is different, only the pan rotation unit 105 will be explained. The pan rotation unit 105 is provided with a rotation unit 1051, an oscillator 1052, a temperature sensor 1053, a driving circuit 1054, and a position sensor 1055.

The rotation unit 1051 is a pan rotation unit (tilt rotation unit in the case of a tilting direction) that rotates the lens barrel 102 in a panning direction. The oscillator 1052 is an actuator for rotating the rotation unit 1051 in a panning direction. An explanation will be given with reference to FIG. 4.

Figure 4:
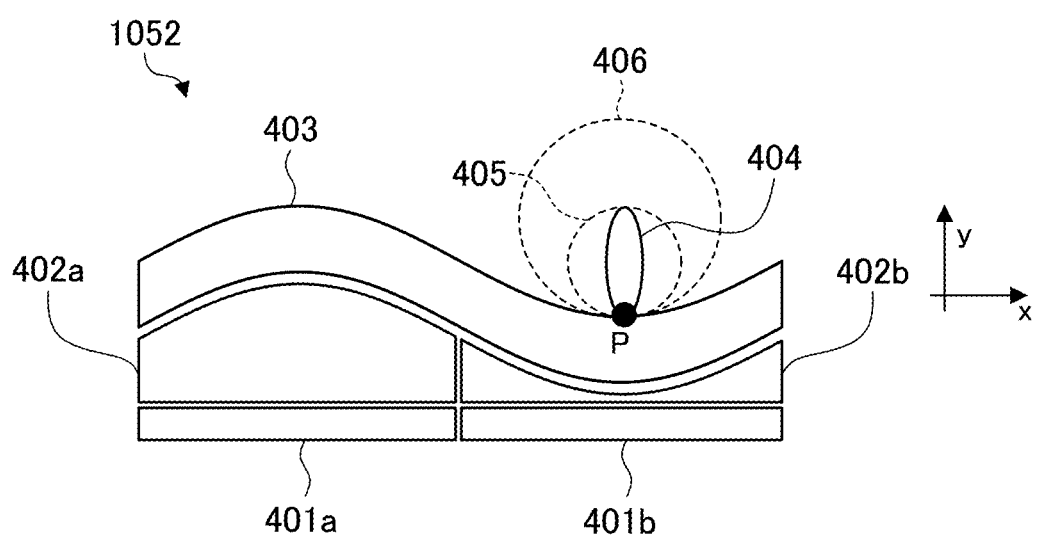
FIG. 4 is a cross-sectional diagram schematically showing an oscillator.

FIG. 4 is a schematic diagram of the oscillator 1052. In FIG. 4, the X-axis represents the moving direction (feeding direction) of the rotation unit 1051, and the Y-axis represents a direction orthogonal (pushing-up direction) to the moving direction. Electrodes 401a and 401b, piezoelectric elements 402a and 402b, and a stator 403 are shown. Two-phase periodic voltage waveforms having different phases that are supplied from the driving circuit 1054 are applied to the electrodes 401a and 401b respectively when driving the rotation unit 1051. When the periodic voltage waveforms are applied to the electrodes 401a and 401b, the piezoelectric elements 402a and 402b expand and contract due to a reverse piezoelectric effect, and two types of standing waves are generated in the stator 403. A substantially elliptical motion at the contact portion between the stator 403 and the rotation unit 1051 is generated by the synthesis of the two types of standing waves. A locus 404 shows the locus of elliptical vibration that is generated at the point P of the stator 403 when a two-phase sinusoidal voltage waveform having a predetermined phase difference is applied to the electrodes 401a and 401b. A locus 405 shows the locus of elliptical vibration that is generated when the phase difference of the two-phase periodic voltage waveform is increased with respect to the voltage waveform at the locus 404. The elliptical vibration shown in the locus 405 has a larger component in the X-axis direction than the elliptical vibration shown in the locus 404. Thus, by changing the phase difference of the two-phase periodic voltage waveforms, the driving velocity of the rotation unit can be changed by changing the ratio of the component in the feeding direction and the component in the pushing-up direction.

A locus 406 shown in FIG. 4 shows the locus of elliptical vibration that is generated when the frequency (driving frequency) of the two-phase periodic voltage waveform is lowered (close to the resonant frequency of the oscillator) with respect to the locus 405. The elliptical vibration shown in the locus 406 has a larger component in both the feeding direction and the pushing-up direction than the elliptical vibration shown in locus 405. By changing the frequency, the driving velocity of the rotation unit can also be changed.

As another method, there is a method of changing the magnitude of elliptical vibration by changing the voltage amplitude of the periodic voltage waveform. When controlling the driving velocity of the rotation unit, it is possible to perform control so that the driving velocity becomes a predetermined value by changing either, or both of the phase difference or the driving frequency.

In the present embodiment, control is performed by using an ultrasonic motor as a vibration wave motor, and by using a vibration frequency of an ultrasonic area that is higher than the resonant frequency. In a case of performing velocity control, there is a first method of changing the vibration frequency by fixing the phase difference, a second method of changing the phase difference by fixing the vibration frequency, and a third method of changing both the vibration frequency and the phase difference. The control mode in which the first method is applied is the frequency control mode, and the control mode in which the second method is applied is the phase difference control mode. Because the frequency control mode has a high output, it is suitable for high-velocity driving of the rotation unit, or driving in a case in which the load on the oscillator has increased due to a low temperature environment or deterioration of durability of the moving parts, and the like. In contrast, the phase difference control mode has a low output but enables high-accuracy positioning and is suitable for driving in a case in which a high stop position accuracy is required, or for fine driving, and the like.

The temperature sensor 1053 detects the temperature of the oscillator 1052. Based on a temperature detection result, it is possible to perform a temperature correction of the frequency of the voltage waveform applied to the oscillator 1052. The position sensor 1055 detects the rotational position of the rotation unit 1051. The position sensor 1055 includes, for example, an optical scale unit, a light-emitting unit, and a light-receiving unit. With respect to the optical scale unit attached to the rotation unit 1051, the light-emitting unit performs light irradiation to a pattern engraved on the optical scale unit. The light-receiving unit outputs an electrical signal (detection signal) by detecting the reflected light from the optical scale unit.

The lens barrel rotation driving unit 112 includes an analog-to-digital converter (hereinafter, referred to as "ADC") 1121. The ADC 1121 performs analog-to-digital conversion with respect to the detection signal of the position sensor 1055. A position computation unit 1122 performs a computation to determine the rotational position of the rotation unit 1051 by acquiring sensor information that has been digitized by the ADC 1121. A target position setting unit 1123 sets a target position (rotational position) of the panning operation control based on a rotation instruction from the operation unit 211.

A PID computation unit 1124 performs a proportional-integral-derivative (PID) computation based on the output of the position computation unit 1122 and the target position setting unit 1123. The PID computation unit 1124 performs a PID computation based on the deviation between a target position of the rotation unit 1051 set by the target position setting unit 1123, and the position of the rotation unit 1051 determined by the position computation unit 1122. The control amount, which is the PID computation result, is output to a conversion unit 1127 described below. A following sensitivity setting unit 1126 sets the sensitivity of following when the image capturing unit performs automatic following with respect to a searched subject. The setting information is output to the conversion unit 1127 described below. The sensitivity of following is described below.

The conversion unit 1127 converts the control amount that has been calculated by the PID computation unit 1124 into the phase difference, amplitude, and frequency of the voltage waveform. In addition, upon automatic following, the conversion unit 1127 calculates a new control amount based on the control amount calculated by the PID computation unit 1124 and the sensitivity set by the following sensitivity setting unit 1126, and converts the control amount to a phase difference, an amplitude, and a frequency of the voltage waveform. That is, the phase difference, amplitude, and frequency of the two-phase driving voltage waveforms are determined according to the control amount. A limiting unit 1125 limits the amount of change in phase difference, amplitude, and frequency of the two-phase driving voltage waveform to the conversion unit 1127.

A driving signal generation circuit 1128 generates a driving signal to be applied to the oscillator 1052 in response to the output of the conversion unit 1127 and outputs the driving signal to the driving circuit 1054 of the pan rotation unit 105. The driving circuit 1054 performs signal conversion and amplification to a predetermined voltage waveform capable of driving the oscillator 1052 with respect to the voltage waveform generated by the driving signal generation circuit 1128. The oscillator 1052 is driven according to the output of the driving circuit 1054.

Figure 5:
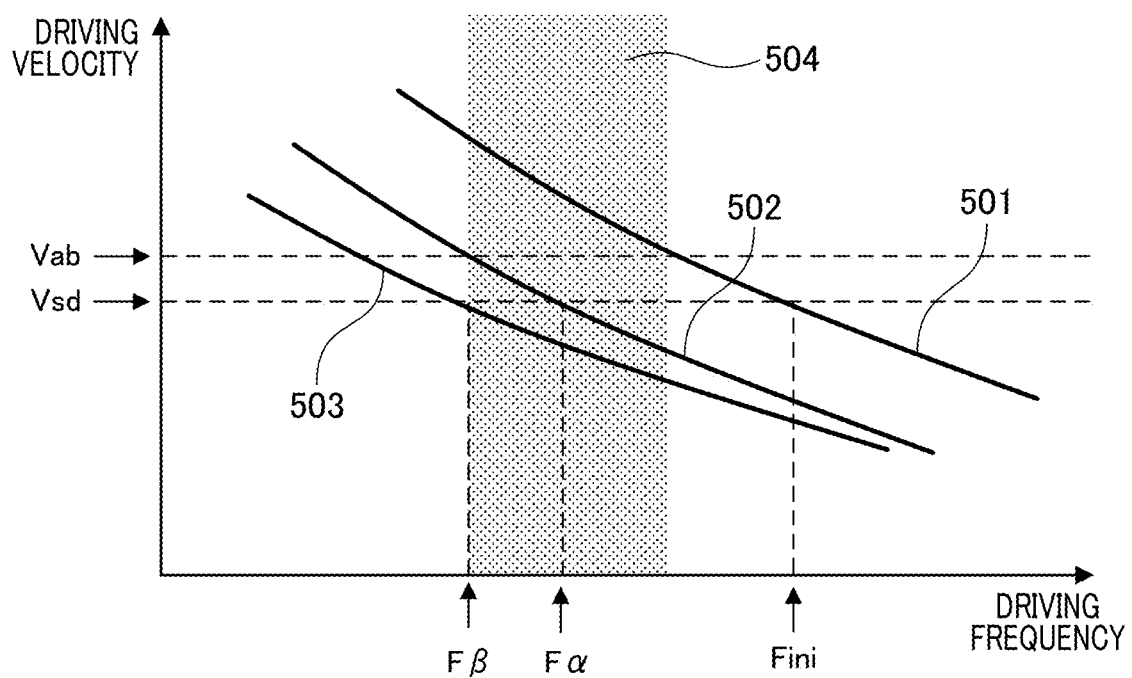
FIG. 5 is a diagram showing a relationship (FV characteristic) between a driving frequency of the oscillator and the driving velocity of the rotation unit.

Referring to FIG. 5, FV characteristics showing the relationship between the driving frequency (F) of the oscillator 1052 and the driving velocity (V) of the rotation unit 1051 will be explained. FIG. 5 shows that the horizontal axis represents the driving frequency of the oscillator, 1052, and the vertical axis represents the driving velocity of the rotation unit 1051. Curves 501, 502, and 503 show temperature changes of the FV characteristics. The curve 501 is an FV curve at a reference temperature (denoted by "tsd"). The curve 502 is an FV curve when the temperature changes by Aa from the reference temperature tsd. The curve 503 is an FV curve when the temperature changes by As from the reference temperature tsd. Area 504 is a prohibited frequency area (hereinafter referred to as "prohibited area") with respect to the frequency of the voltage waveform applied to oscillator 1052. In each of the curves 501 and 502, the phase difference between the two-phase driving voltage waveforms is 90°. Vsd is a reference velocity when performing temperature correction of the oscillator 1052.

The driving frequency (denoted by "Fp") at the time of phase difference control differs depending on the temperature and is represented by Equation 1.

$$Fp = Fini - k \times (tx - tsd) \quad (1)$$

In Equation 1, tx represents the temperature detected by the temperature sensor 1053. Fini represents the starting frequency when the temperature is the reference temperature tsd. k represents the temperature correction coefficient of the starting frequency. Fp (=Fini) when tx=tsd is a frequency at which the driving velocity becomes Vsd in a case in which a two-phase driving voltage waveform having a phase difference of 90° is applied to the oscillator 1052 at the reference temperature tsd. In addition, Fα is the driving frequency when the temperature changes from a reference temperature tsd by Δα, and Fβ is the driving frequency when the temperature changes from a reference temperature tsd by Δβ.

The prohibited area 504 is a frequency area that may adversely affect the image and operation of the camera due to the influence of mechanical vibration that is caused by the oscillator or electrical noise that is generated by the driving frequency circuit.

For example, in a case in which the temperature changes from the reference temperature tsd by Aa, the driving frequency Fα becomes within the prohibited area. In addition, in a case in which the driving frequency becomes within the prohibited area due to temperature correction, the driving frequency is set to Fβ, which is the frequency closest to Fα outside of the prohibited area. However, in a case in which the driving frequency Fβ when the temperature changes from the reference temperature tsd by Δβ, the velocity at which the phase difference of the two-phase driving voltage waveform is 90° becomes a velocity Vab that is greater than the reference velocity Vsd. When the position control of the rotating unit 1051 is performed in this state, in a case in which the change amount of the rotation unit with respect to the change in the phase difference of the driving voltage waveform of the rotation unit is larger than expected, there is a possibility that proper control may not be possible or that an uncontrollable (oscillation) state may occur.

For example, assume a case in which the temperature-corrected driving frequency becomes within the prohibited area, as shown in the curve 502. In this case, the control unit 212 performs control to adjust the driving velocity when the phase difference is 90° to be Vsd by changing the voltage amplitude of the two-phase driving voltage waveform. The voltage amplitude of the driving voltage waveform when the temperature of the oscillator is the reference temperature tsd is denoted by "Asd". When the voltage amplitude of the driving voltage waveform in curve 503 is denoted by "Aβ", As becomes Equation 2.

$$A\beta = (Vsd \pm Vab) \times Asd \quad (2)$$

Thus, in a case in which the driving frequency becomes the frequency in the prohibited area by temperature correction, it is necessary to simultaneously change the driving frequency and the voltage in order to match the control performance of the rotation unit 1051 to the performance before the driving frequency. In a case in which the voltage and phase difference of the driving voltage waveform are changed simultaneously and discontinuously, unnecessary vibration due to the switching of the FV characteristics may be generated in the oscillator 1052, and uneven rotation and abnormal noise may be generated in the rotation unit. For example, in a case in which uneven rotation occurs during video recording, video data having image blur in the rotation direction due to the influence of uneven rotation may be acquired. If temperature correction of the driving frequency is not performed, such a problem does not occur. However, when position control of the rotation unit 1051 is performed, the amount of change of the rotation unit with respect to the change in the phase difference of the driving voltage waveform of the rotation unit becomes unsuitable. As a result, in a case in which uneven rotation has occurred without suppressing load fluctuations due to a change in the rotational position of the rotation unit 1051, there is a possibility that video data having image blurring may be acquired.

Figure 6:
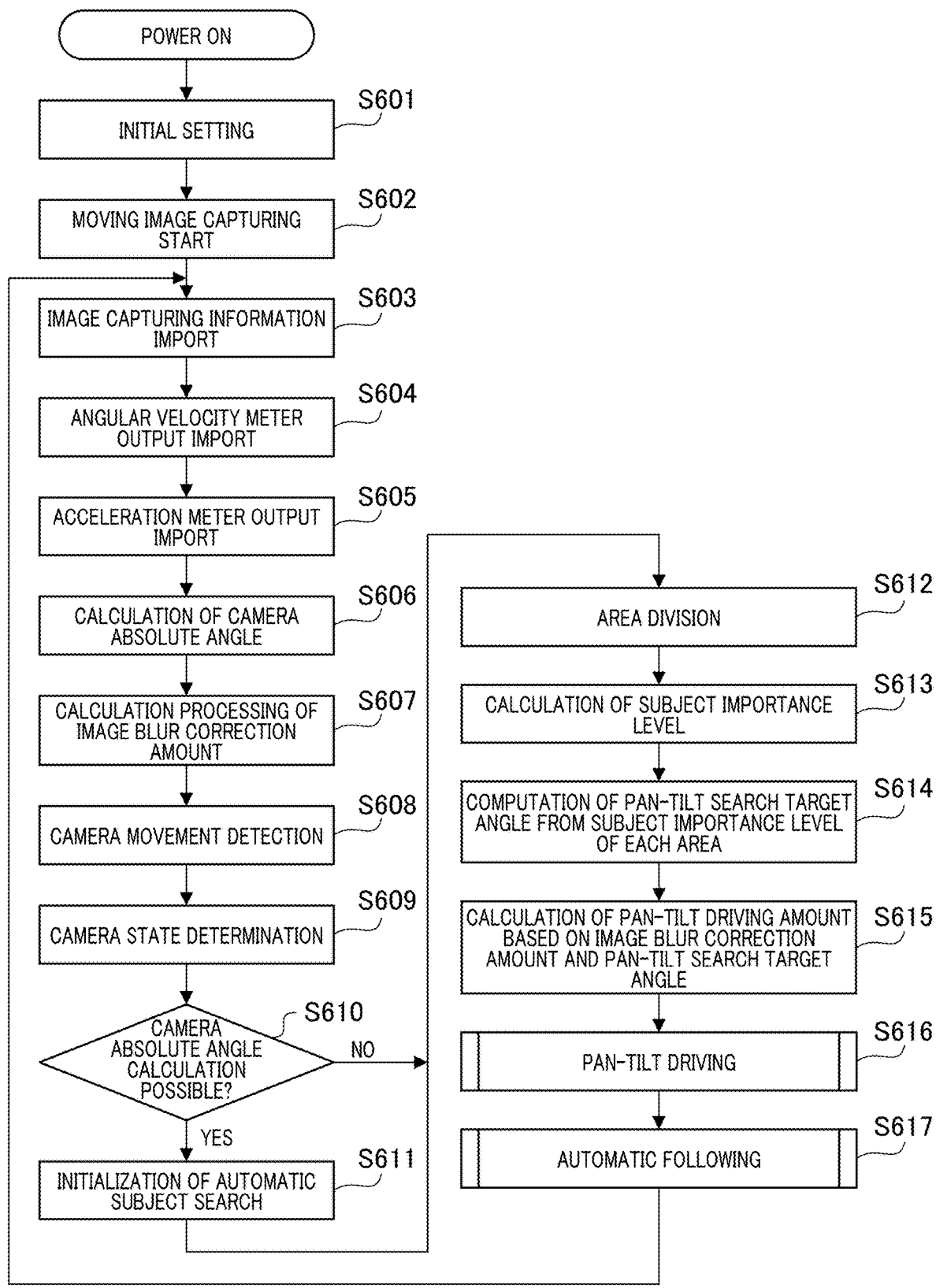
FIG. 6 is a flowchart explaining an operational control of the image capturing apparatus.

FIG. 6 is a flowchart explaining an example of the operation of the image capturing apparatus in the present embodiment. The processing described below is started when the main power supply of the camera 101 is turned on, and the CPU of the control unit 212 executes the automatic subject search, automatic following, and automatic image capture processing according to a control program.

When the power supply button is operated on the operation unit 211 and the main power supply is turned on, the processing proceeds to step S601. In step S601, the control unit 212 performs various initial settings (image capturing/automatic search, and the like). In the initialization of automatic search, processing such as initialization of the subject importance level, which will be explained later, is performed. When the initial setting is completed and the image information from the image capturing element can be acquired, the processing proceeds to step S602.

At S602, moving image capturing is started. The image processing unit 206 performs image processing of the image capturing signal that has been acquired by the image capturing unit 205, and generates predetermined image data. The predetermined image data is image data for subject detection, and subject detection, such as of a person or object, is performed based on the image. For example, in the detection of a person, face detection processing and human body detection processing of a subject person are performed. In the face detection processing, a pattern for determining the face of a person is specified in advance, and a portion that is included in the captured image and matches the pattern can be detected as a face image of the person. In addition, a face reliability degree that indicates the certainty of the face of the subject is calculated at the same time. The face reliability degree can be calculated from, for example, a size of a face area in the image, and a degree of matching between the face area and the face pattern and the like. Object recognition can be performed in a similar manner, and it is possible to recognize an object that matches a pattern that has been registered in advance.

In addition, there is also a method of extracting a feature subject by using a histogram of hue, saturation, and the like in the captured image. With respect to an image of a subject captured within an image capturing angle of view, the distribution derived from a histogram of the hue, saturation, and the like of the image is divided into plurality of sections, and processing to classify the captured images in each section is executed. For example, a histogram of a plurality of color components is created for the captured image. The image area of a subject is recognized by dividing the histogram data into a mountain-shaped distribution range, and classifying the images captured in the areas belonging to the same combination of sections. By calculating an evaluation value for each image area of a recognized subject, it is possible to determine an image area of a subject having the highest evaluation value as the main subject area. By the above method, it is possible to obtain the information of each subject from the image information.

After image capturing information such as subject detection information is introduced at step S603, the processing proceeds to step S604. At step S604, the apparatus shake detection unit 208 acquires angular velocity information via the angular velocity meter 106. Next, at step S605, the apparatus shake detection unit 208 acquires acceleration information via the acceleration meter 107. At step S606, the control unit 212 performs a calculation process of the camera absolute angle based on the acquired angular velocity and acceleration information, and the processing proceeds to step S607. At step S607, the control unit 212 performs calculation processing of the image blur correction amount in order to suppress image blur. For example, an image blur correction amount is, calculated in order to suppress image blur caused by hand shake or the shaking of the human body and the like that occurs in a hand-held camera or in a wearable device that is worn on the human body. The processing of steps S606 and S607 is described below with reference to FIG. 7 and FIG. 8. After step S607, the processing proceeds to step S608.

In step S608, camera movement detection processing is performed. The apparatus movement detection unit 209 detects the presence or absence of movement and the movement amount of the camera 101 by using GPS position information and acceleration information. For example, in a configuration in which an external device capable of acquiring GPS location information and the camera 101 are mutually communicable, the external device notifies the camera 101 of the movement information in a case in which there is a change in the GPS location information. The camera 101 can perform local movement detection based on the acquired movement information. After step S608, the processing proceeds to step S609.

At step S609, the control unit 212 performs a camera state determination. It is possible to determine what kind of vibration state or motion state the camera is currently in from an angle and a movement amount and the like detected from the angular velocity information, the acceleration information, the GPS position information, and the like. For example, a case in which a camera that moves with a vehicle is used to capture an image is assumed. In this case, the subject information of the surrounding environment (scenery, and the like) changes in accordance with the movement of the vehicle. The control unit 212 determines whether or not the camera is in a "vehicle detection state" in which the camera is moving with the vehicle. The determination result may be used in automatic subject search, described below. In addition, the control unit 212 compares the angle change amount of the camera with a threshold value, and in a case in which the angle change amount is less than or equal to the threshold value, determines that the camera is in a "stationary capturing state" state with almost no shaking. In a case in which a "stationary capturing state" has been determined, there is almost no angular change of the camera itself, and thus it is possible to perform a subject search for stationary capturing. In addition, in a case in which the angle change amount of the camera is greater than a threshold value, the control unit 212 determines that the camera is in a "handheld state". In this case, it is possible to perform a subject search for hand-held image capturing. It should be noted that the subject search method in each state is described below. After step S609, the processing proceeds to step S610.

At step S610, the control unit 212 determines whether or not the camera absolute angle acquired at step S606 is accurately calculated. In a case in which detection of the camera absolute angle is difficult, or detection is not possible (undetectable), the processing proceeds to step S611. A state in which the camera absolute angle is not detectable is, for example, a state in which an impact on the camera is very large and causes a hindrance to the calculation of the camera angle based on the output of the acceleration meter 107. Alternatively, it is a state in which the angular velocity of the camera is so large that it exceeds the detectable range of the angular velocity meter 106. In a case in which it has been determined in step S610 that the camera absolute angle is in a detectable state, the processing proceeds to step S612.

In step S611, the initialization processing of the automatic subject search is performed, and processing such as initialization of the subject importance level, which is explained below, is performed. Next, the processing proceeds to step S612, and the control unit 212 executes the area division processing. The area division processing is performed based on the absolute angle of the camera 101 at the time of initialization in step S601 and at the time of initialization of the automatic subject search in step S611. The image that the camera 101 is acquiring at this time is divided into plurality of blocks corresponding to the divided areas by area division. The area division processing is described below with reference to FIG. 9. After step S612, the processing proceeds to step S613.

At step S613, the control unit 212 performs calculation processing of the subject importance level. The subject importance level is calculated for each area based on the subject information and the like in the acquired images. Details of the calculation processing are described below.

Next, at step S614, the control unit 212 executes processing to calculate a target angle of the search in the panning direction and the tilting direction, based on the subject importance level of each area. Next, at step S615, the control unit 212 executes processing to calculate a panning driving amount and a tilting driving amount from the image blur correction amount that was calculated at step S607, and the target angle that was calculated at step S614. Details of the processing of step S614 and step S615 are described below. After step S615, the processing proceeds to step S616.

At step S616, the control unit 212 drives and controls each of the tilt rotation unit 104 and the pan rotation unit 105 by the lens barrel rotation driving unit 112. The tilt rotation unit 104 is driven according to a driving angle based on the tilting driving amount, and the pan rotation unit 105 is driven according to a driving angle based on the panning driving amount. Next, at S617, the control unit 212 executes the automatic following processing. After the automatic following processing is performed based on the information of the searched subject, the processing proceeds to step S603. The automatic following processing is described below.

Next, the calculation of the camera absolute angle shown in step S606 in FIG. 6 and the calculation of the image blur correction amount of step S607 will be explained. As shown in FIG. 1A, the angular velocity meter 106 and the acceleration meter 107 are mounted on the fixed unit 103 of the camera 101. Because information with respect to angular velocity and acceleration at a position on the fixed unit 103 is output, the camera absolute angle is calculated based on this information. That is, the camera absolute angle at a position on the fixed unit 103 is calculated. Further, in order to correct the rotational blur of the lens barrel 102 (image capturing element blur), computation of the correction angle is performed based on the angular velocity information at the position on the fixed unit 103, and the image blur correction amount is calculated. The tilt rotation unit 104 and the pan rotation unit 105 are driven based on the image blur correction amount. As a result, image blur correction is performed by the rotation of the lens barrel 102.

Figure 7:
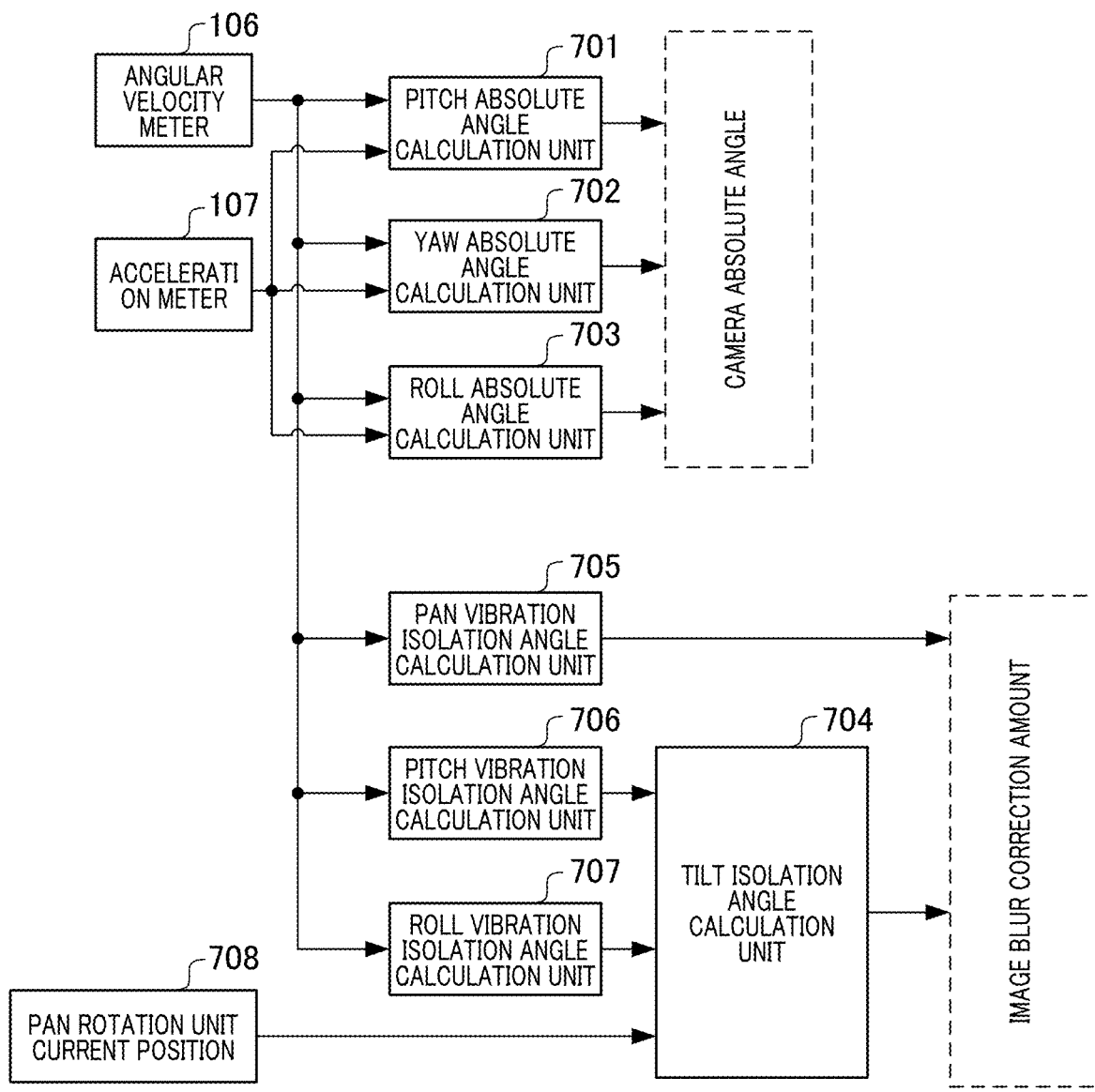
FIG. 7 is a functional block diagram of an absolute angle calculation and an image blur correction amount calculation unit.

FIG. 7 is a functional block diagram explaining the calculation processing of the camera absolute angle and the calculation processing of the image blur correction amount. The calculation processing is performed according to a program executed by the CPU of the control unit 212. First, a method of calculating the camera absolute angle will be explained. The output of the angular velocity meter 106 and the output of the acceleration meter 107 are each input to a pitch absolute angle calculation unit 701, a yaw absolute angle calculation unit 702, and a roll absolute angle calculation unit 703. The angular velocity meter 106 outputs each detection signal in the pitch direction, the yaw direction, and the roll direction. The acceleration meter 107 outputs each detection signal of the X-axis direction, the Y-axis direction, and the Z-axis direction. The pitch absolute angle calculation unit 701, the yaw absolute angle calculation unit 702, and the roll absolute angle calculation unit 703 calculate absolute angles in each of the pitch direction, the yaw direction, and the roll direction. Thus, it is possible to calculate the absolute angle at the position of the angular velocity meter 106 and the acceleration meter 107, that is, the absolute angle on the fixed unit 103.

It is possible to calculate each of the absolute camera angle in the pitch direction, yaw direction, and roll direction from the relationship between each of the outputs of the three axes of the acceleration meter 107. The pitch absolute angle, yaw absolute angle, and roll absolute angle are each calculated in the acceleration computation. An absolute angle can be calculated accurately only in a case in which the camera is in a stationary state and is not affected by external acceleration, that is, in a case in which the acceleration detected by the acceleration meter 107 is dominated by gravitational acceleration. In a case in which image capturing is performed in a state in which the camera is moving, if the influence of acceleration other than gravitational acceleration (vibration acceleration and the like) is large, it is difficult to perform accurate computation of the absolute angle. For example, this corresponds to performing image capturing while the photographer is walking with the camera in hand, or performing image capturing by fixing and attaching the camera to a part of the human body, or performing image capturing by attaching the camera to a vehicle such as a car or two-wheeled vehicle. Further, assume a case in which the camera angle is estimated only by the angular velocity meter 106. In this case, although it is possible to estimate the attitude angle by the integration computation of the angular velocity output, it may be difficult to perform accurate absolute angle computation due to the accumulation of errors caused by the integration.

Therefore, unnecessary signal components in noise areas which are not appropriately dealt with by the angular velocity meter 106 and the acceleration meter 107 are removed (or reduced), and the absolute angle computation is performed by synthesizing the respective detected signals by sensor fusion. More specifically, the computation is performed by using a Kalman filter, a complementary filter, or the like. The signal after removing the low-frequency noise that has the greatest effect on the integration error of the angular velocity meter 106 is combined with the signal after removing the high-frequency noise that has the greatest effect on the computation error due to disturbances of the acceleration meter 107. Sensor fusion enables accurate absolute angle computation with noise removed (or reduced).

The pitch absolute angle calculation unit 701, the yaw absolute angle calculation unit 702, and the roll absolute angle calculation unit 703 perform absolute angle calculation by sensor fusion of the angular velocity from the angular velocity meter 106 in each direction and the absolute angle in the acceleration computation, and acquire the absolute angle in each direction. In addition, in an axis in which it is not possible to calculate the camera absolute angle from the acceleration meter 107, the absolute angle computation is performed only with the output of the angular velocity meter 106. For example, assume a case in which the Y-axis direction in FIG. 1B matches the direction of gravitational force. With respect to the yaw rotation axis which has the Y-axis as the rotation center axis, the absolute angle is computed based only on the output of the angular velocity meter 106. The last time point at which an absolute angle is determined to be able to be calculated by an angular change of the camera is the starting point at which the absolute angle is acquired, and the absolute angle computation is performed by an integration of the angular velocity in a period during which the absolute angle is not able to be calculated.

Next, a method of calculating the image blur correction amount will be explained with reference to FIG. 7 and FIG. 8. Image blur correction is possible if the tilt rotation unit 104 and pan rotation unit 105 are rotated and driven based on the signal of the camera absolute angle acquired by the calculation method of the camera absolute angle. However, in a case in which image blur correction control is performed based on the camera absolute angle, control to continuously maintain the same orientation indefinitely is performed. As a result, this gives rise to problems such as the composition not being changed when the photographer performs image capture while moving, or image blur correction control being not possible beyond the movable ends where the driving angle is the limit value of each rotation unit. As a countermeasure to such a problem, in the present embodiment, image blur correction is not performed on the low frequency component of the shake, and image blur correction control is performed on the high frequency component of the shake. That is, in the calculation processing of the image blur correction amount, the image blur correction amount is calculated by using only the output of the angular velocity meter 106 for the image blur correction control corresponding to the high-frequency component, without performing the calculation processing for the image blur correction control corresponding to the low-frequency component.

The output of the angular velocity meter 106 has the DC (direct current) component thereof cut by a high-pass filter (hereinafter referred to as "HPF") having a high-pass characteristic. The output of the HPF is integrated and converted into an angle signal (hereinafter referred to as "vibration isolation angle"). The angular velocity meter 106 is mounted on the fixed unit 103. The rotation axis in the yaw direction of the angular velocity meter 106 coincides with the rotation axis of the pan rotation unit 105. The pan vibration isolation angle calculation unit 705 of FIG. 7 converts the angular velocity in the yaw direction output by the angular velocity meter 106 into an angle by performing integration by HPF processing. Thus, the vibration isolation angle in the panning direction (yaw direction) can be calculated. Image blur correction of the panning direction is performed by rotationally driving the pan rotation unit 105 based on the vibration isolation angle of the panning direction that has been calculated.

With respect to the tilting direction, because the angular velocity meter 106 is mounted on the fixed unit 103, control to perform image blur correction in the tilting direction varies depending on the rotational angle of the pan rotation unit 105. The pitch vibration isolation angle calculation unit 706 of FIG. 7 calculates the vibration isolation angle in the pitch direction (pitch vibration isolation angle) by acquiring the output of the angular velocity meter 106. In addition, a roll vibration isolation angle calculation unit 707 calculates the vibration isolation angle in the roll direction (roll vibration isolation angle) by acquiring the output of the angular velocity meter 106. A specific explanation will be provided with reference to FIG. 8.

Figure 8A:
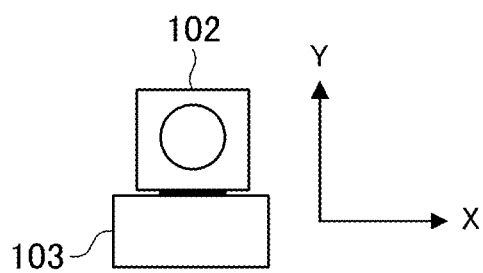
FIG. 8A and FIG. 8B are diagrams explaining the direction of the image capturing apparatus.
Figure 8B:
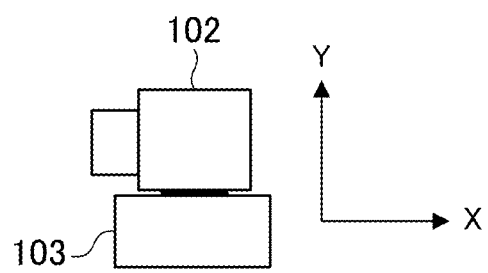

FIG. 8 is a diagram explaining the image capturing direction of the camera 101. FIG. 8A shows the state of a normal position of the camera 101 during a rotation in the panning direction, that is, a state in which the X-axis is always positioned in a direction that is perpendicular with respect to the optical axis of the image capturing optical system. FIG. 8B shows a state in which a panning rotation angle (denoted by "θap") is 90 degrees, and a Z-axis (not shown), which is orthogonal to the paper surface, is always positioned in a direction that is perpendicular with respect to the optical axis of the image capturing optical system.

In the state of FIG. 8A, it is possible to directly calculate the pitch vibration isolation angle (denoted by "θpi") calculated by the pitch vibration isolation angle calculation unit 706 as the vibration isolation angle in the tilting direction (tilt vibration isolation angle). Further, in the state of FIG. 8B, it is possible to directly calculate the roll vibration isolation angle (denoted by "θri") calculated by the roll vibration isolation angle calculation unit 707 as the tilt vibration isolation angle. The vibration isolation angle (tilt isolation angle) calculated by a tilt isolation angle calculation unit 704 in FIG. 7 is denoted by "θt1". The tilt vibration isolation angle θt1 can be calculated by Equation 3.

$$\theta t1 = \theta pi \times \cos(\theta ap) + \theta ri \times \sin(\theta ap) \quad (3)$$

In Equation 3, cos( ) represents a cosine function, and sin( ) represents a sine function. θt1 is a function of θpi, θri, and θap, and can be calculated from the pitch vibration isolation angle and roll vibration isolation angle based on the panning rotation angle. In FIG. 8A, θap=0, and the relationship θt1=θpi is established. In FIG. 8B, θap=90°, and the relationship θt1=θri is established. The tilt vibration isolation angle calculation unit 704 calculates the tilt vibration isolation angle by Equation 3.

In Equation 3, the tilt vibration isolation angle is calculated by a conversion based on the pitch vibration isolation angle and the roll vibration isolation angle, in accordance with the panning rotation angle. As another method, there is a method to acquire the pitch angular velocity and roll angular velocity from the angular velocity meter 106 and calculate the tilt angular velocity in accordance with the panning rotation angle. The tilt vibration isolation angle can be calculated by performing angular conversion on the tilt angular velocity by HPF processing and integration processing.

According to the above method, the pan vibration isolation angle is acquired by the pan vibration isolation angle calculation unit 705, and the tilt vibration isolation angle can be acquired by the tilt vibration isolation angle calculation unit 704. Image blur correction in the tilting direction and the panning direction can be performed by performing rotational driving of the tilt rotation unit 104 and the pan rotation unit 105 according to the image blur correction amount based on the respective vibration isolation angles thereof.

Further, the absolute angle of the lens barrel 102 can be calculated from the calculated camera absolute angle and the rotational positions of the tilt rotation unit 104 and pan rotation unit 105. Specifically, an optical axis-based camera angle in the yaw direction (the yaw absolute angle of the lens barrel 102) can be calculated by subtracting the rotational angle of the pan rotation unit 105 from the yaw absolute angle that is output by the yaw absolute angle calculation unit 702.

The rotational angle of the lens barrel in the pitch direction and the rotational angle of the lens barrel in the roll direction which have been converted to the position of the fixed unit 103 can be calculated from the rotational position of the pan rotation unit 105 and the rotational position of the tilt rotation unit 104. An optical axis-based camera angle in the pitch direction (pitch absolute angle of the lens barrel 102) can be calculated by subtracting the lens barrel rotational angle in the pitch direction from the pitch absolute angle that is output by the pitch absolute angle calculation unit 701. An optical axis-based camera angle in the roll direction (roll absolute angle of the lens barrel 102) can be calculated by subtracting the lens barrel rotational angle in the roll direction from the roll absolute angle that is output by the roll absolute angle calculation unit 703.

In this manner, the camera angle which is based on the optical axis can be determined. Thus, it is possible to determine in which angular direction the lens barrel (camera optical axis) is currently pointing, based on the angle at camera activation, for example. After the camera absolute angle and the image blur correction amount are calculated, the processing from steps S608 to S611 of FIG. 6 are executed, and area division processing is performed at step S612. The area division processing will be explained with reference to FIG. 9.

FIG. 9 is a diagram for explaining area division of each angular area in the spatial coordinates of the image capturing apparatus. The position of the origin O of the spatial coordinates is taken as the camera position. FIG. 9A shows an example of performing area division on the entire circumference, with the origin O set as the center. In the example of FIG. 9A, divisions of equal angles are performed at 22.5 degrees in each of the tilting direction and the panning direction. In such a division, as the angle in the tilting direction separates from 0 degrees, the circumferential length in the panning direction becomes smaller, and the area of the divided areas becomes smaller. FIG. 9B shows an example in which, in a case in which the angle in the tilting direction is 45 degrees or more, area division has been performed by setting an angle larger than 22.5 degrees in the panning direction.

Figure 9B:
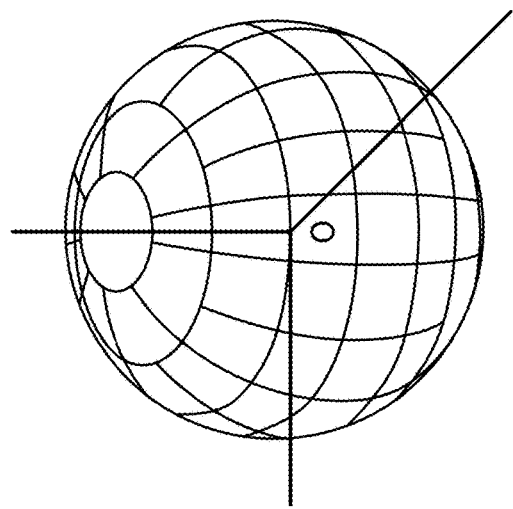
FIG. 9A to FIG. 9D are explanatory diagrams of area division for each angle area in the spatial coordinates of the image capturing apparatus.
Figure 9D:
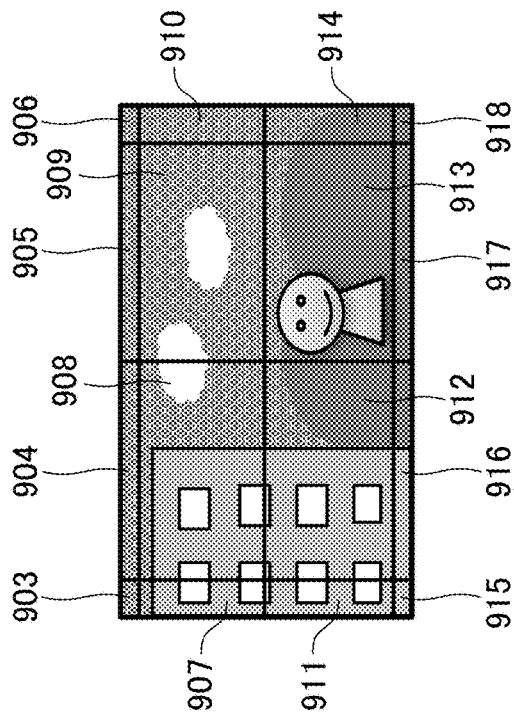
Figure 9A:
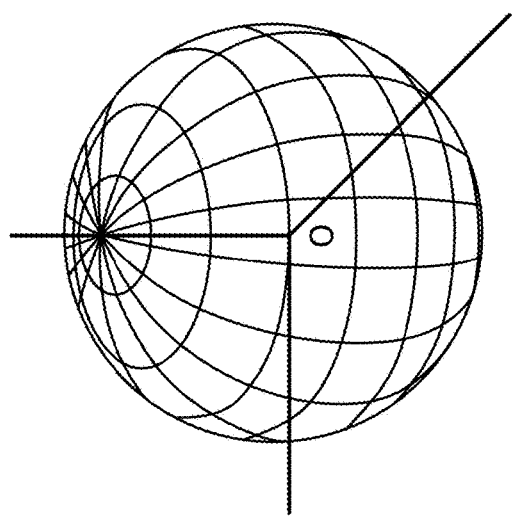
Figure 9C:
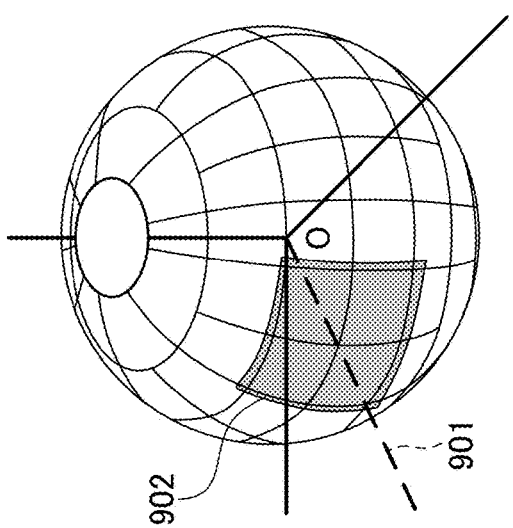

FIG. 9C shows an example in which area division is performed within an image capturing angle of view. An axis 901 indicates the direction of the camera 101 at the time of initialization (the direction of the optical axis of the image capturing optical system), and area division is performed with this angle of direction serving as a reference. An image angle of view range 902 corresponds to a field angle range of a captured image. FIG. 9D shows an example in which a captured image is divided into a plurality of image areas 903 to 918 by area division within the image corresponding to an angle of view.

Figure 10B:
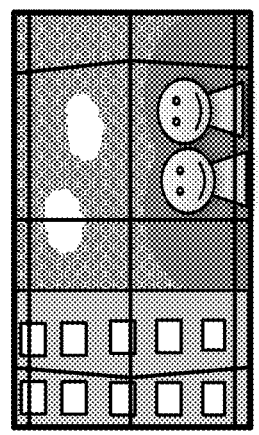
FIG. 10A to FIG. 10C are diagrams for explaining area division in the captured image at the time of initialization.
Figure 10C:
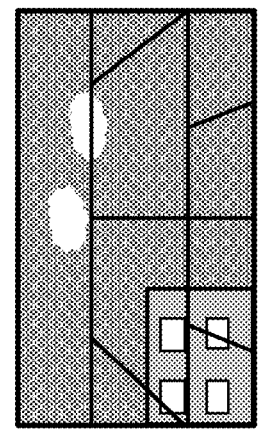
Figure 10A:
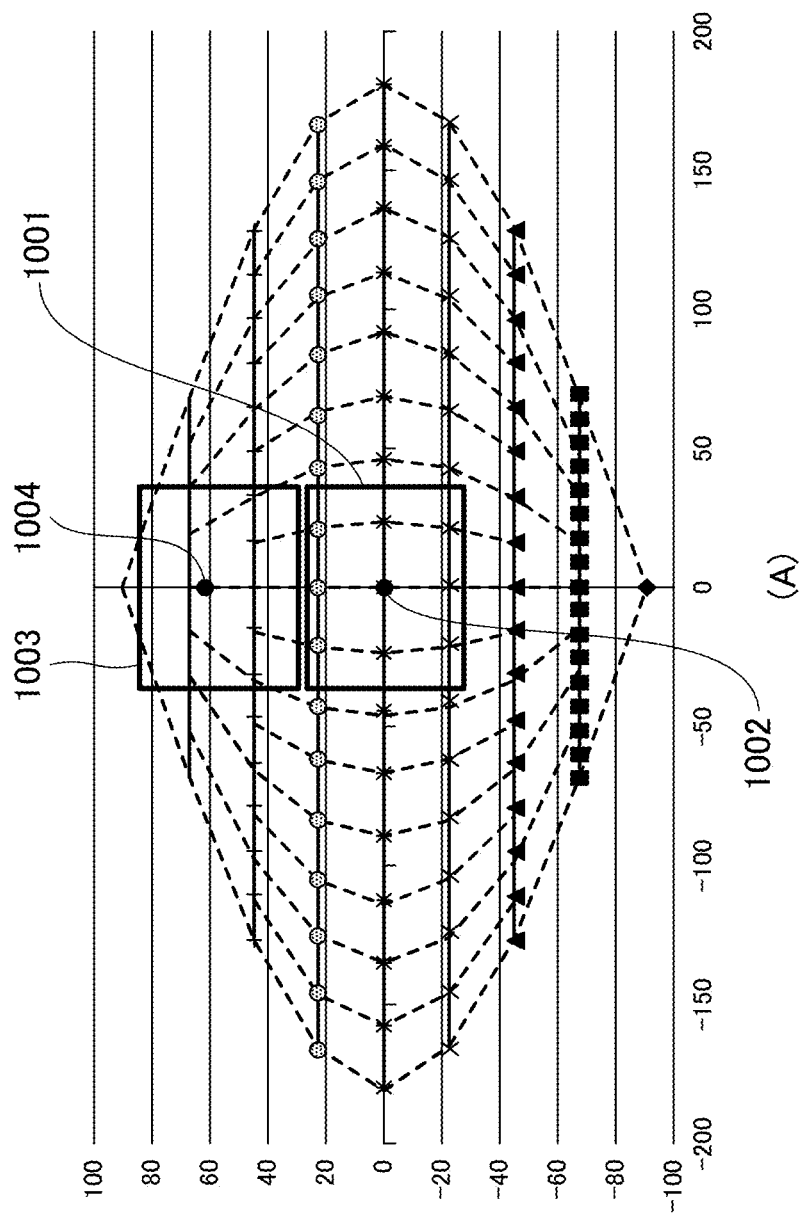

Referring to FIG. 10, an example of area division within an image capturing angle of view when the direction of the camera 101 is set to the direction of the time of initialization (refer to FIG. 9: 901) is explained. In FIG. 10A, the angle of the panning direction is shown on the horizontal axis, and the angle of the tilting direction is shown on the vertical axis. FIG. 10A schematically shows an area based on the absolute angle of the camera 101 at the time of initialization of automatic subject search. FIG. 10B shows an example of a captured image corresponding to an image capturing angle of view 1001 and angle of view center 1002 in a case in which the angle of view in the tilting direction is 0 degrees. FIG. 10C shows an example of a captured image corresponding to an image capturing angle of view 1003 and angle of view center 1004 in a case in which the angle in the tilting direction is 55 degrees.

In the case of FIG. 10B (in which the angle of the tilting direction is 0 degrees), because the angular range in the lateral (horizontal) direction is not that greatly different, the difference in the area of the divided areas is relatively small. In contrast, in the case of FIG. 10C (in which the angle of the tilting direction is 55 degrees), the angular range in the lateral direction greatly varies depending on the angle in the vertical direction (height direction). Thus, in a case in which the angle of the tilting direction is 45 degrees or more, the angular range in the lateral (horizontal) direction is set to be larger than 22.5 degrees. Accordingly, it is possible to prevent the area of the divided area from becoming too small as the angle of the tilting direction becomes larger.

Figure 11B:
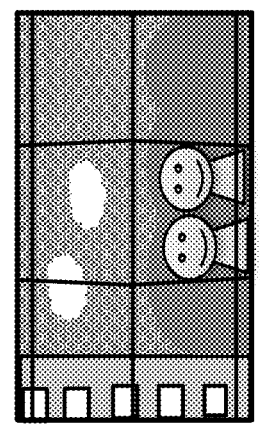
FIG. 11A and FIG. 11B are diagrams for explaining area division in the captured image at the time of a panning operation.
Figure 11A:
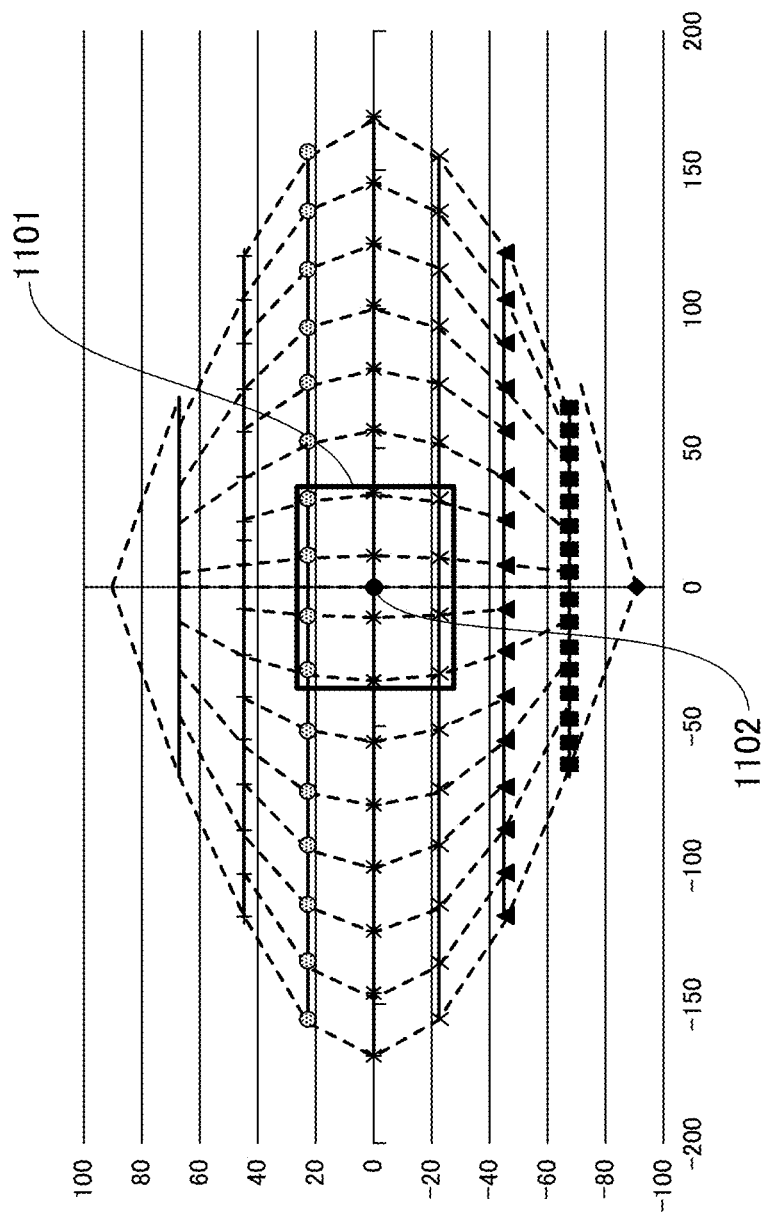

Referring to FIG. 11, an example of area division when the camera 101 has been rotated 11.25 degrees in the panning direction from an initial position is explained. FIG. 11A shows an image capturing angle of view 1101 and an angle of view center 1102 in a case in which the angle of view of the tilting direction is 0 degrees. The angular range of the area division is set with 11.25 degrees as the center in the horizontal direction. FIG. 11B shows an example of a captured image corresponding to the image capturing angle of view 1101 and the angle of view center 1102.

Area division within the image capturing angle of view can be performed by using Equations 4 and 5.

$$\theta ay = \theta y + \theta y^* \quad (4)$$

$$\theta ax = \theta x^* \times \cos(\theta ay) \quad (5)$$

The definitions of the various quantities in the above equations are shown below. The initial position of the camera 101 is referenced to 0 degrees.

θx: Angle of the panning direction (based on the initial position).
θy: Angle of the tilting direction (based on the initial position).
θx*: Angle from the angular position of the panning direction (center in the horizontal direction of the image) to the division angle.
θx*: Angle from the angular position of the tilting direction (center in the vertical direction of the image) to the division angle.
θax: Angular value in the horizontal direction from the horizontal center in the image to the division angle of the horizontal direction.
θay: Angular value in the vertical direction from the vertical center in the image to the division angle of the vertical direction.

The control unit 212 determines all of the divided areas that are present within the angle of view. An image corresponding to the image capturing angle of view is divided into a plurality of areas in the image, as shown in FIGS. 10B and 10C and FIG. 111B. For example, although the division angle in the horizontal direction is basically set to be 22.5 degrees, with respect to the range of 45 to 67.5 degrees in the vertical direction, it is set to be 45 degrees. Further, since division in the horizontal direction is not performed for the range of 67.5 degrees to 90 degrees in the vertical direction, this range is set as one area.

After area division (step S612 of FIG. 6), the control unit 212 performs a calculation of the subject importance level (step S613 of FIG. 6). For example, the image shown in FIG. 9D is acquired, and subject importance levels are calculated for each area based on the subject information and the like in the image. However, in a case in which the ratio of the divided image to the image capturing angle of view is smaller than a threshold value, the subject importance level is not determined or updated. Specifically, when the size of the image corresponding to the image capturing angle of view is assumed to be 100%, in a case in which the size of the image in the area that is shown on the screen (the divided area) is 50% or less, the control unit 212 does not perform a determination or update of the subject importance level.

The subject importance level (hereinafter also referred to simply as "importance level") is set for each set area (divided area) according to various conditions. The control unit 212 calculates each of the importance levels based on the settings shown below.

(A) Importance level setting corresponding to person information.
(B) Importance level setting corresponding to object recognition information.
(C) Importance level setting corresponding to scene
(D) Importance level setting corresponding to speech information
(E) Importance level setting corresponding to image motion information (F) Importance level setting corresponding to past image capturing information
(G) Importance level setting corresponding to unsearched time
(H) Importance level setting corresponding to camera vibration state First, (A) will be explained. The control unit 212 performs setting of the importance level according to the person information at the position within each area at the image capturing angle of view. In this case, known face detection techniques can be used. For example, there is a method that uses knowledge about the face of a subject (skin color information, parts such as an eye, nose, mouth, and the like). Another method is to configure a discriminator for face detection via a learning algorithm represented by a neural network. Furthermore, to improve detection accuracy, it is common to combine a plurality of face detection methods. Based on a face detection result, the size and orientation of the face, and the reliability indicating the certainty that it is a face, and the like are calculated. Furthermore, there is a technique of detecting a facial expression from detected information of each organ of a face. It is possible to detect the degree of opening of the eyes or the degree of smiling. More specifically, a feature value required for detecting a facial expression is acquired from, for example, profiles of the organs of a face (for example, eye, nose, and mouth) and positions of the inner corner of the eye, the outer corner of the eye, the nostril, the corner of the mouth, and the lips. The method of acquiring the feature values includes, for example, a method of performing template matching by using templates of face constituent parts and a method of performing a learning algorithm using a large number of sample images of face constituent parts. The degree of smiling, closing of the eyes, winking, and facial expression (delight, surprise, anger, sadness, straight face, and the like) detection information can be acquired based on the acquired feature values.

Furthermore, individual face data can be registered in advance, and personal face authentication to detect whether or not a person is a specific individual from the detected face can be performed. The control unit 212 determines whether or not the face data matches the target data registered in advance in a database, or the degree of match thereof. Processing is performed to extract feature information for identifying the subject area as an object to be authenticated is extracted from image data of the detected subject. The control unit 212 then compares the extracted feature information with feature information of the subject image previously registered in a database. It is possible to perform authentication to determine which registration target is the subject to be authenticated, or whether there is a corresponding registration target or not, based on the authentication evaluation value indicating the similarity obtained by comparison.

For example, a threshold value is provided with respect to the authentication evaluation value, and in a case in which the authentication evaluation value is equal to or greater than a threshold value, the control unit 212 can determine that the subject to be authenticated is the corresponding subject registered in the database. Specifically, the following Kr, Ka, and Ks are used.

Kr: Value associated with the level of face reliability.
Ka: Value associated with the level of individual face authentication information.
Ks: Value associated with the level of facial expression.

For example, as the face reliability increases, Kr is a value that increases. The reliability is determined by using, for example, the size of a face, the orientation of a face, the certainty of a face, and the like. Furthermore, Ka is set for each face based on the degree of importance registered in advance for each individual face or on past image capturing information, which is described below. Furthermore, Ks is expressed by a level for each face based on the levels corresponding to previously set facial expressions. For example, Ks is set to a high level for expressions such as smile, delight, surprise, and the like, and Ks is set to a low level for expressions such as anger, sadness, straight face, closing of the eyes, and the like. The control unit 212 can perform variable settings of Ks according to the degree of each facial expression, for example, in the case of a smile, the degree of smile.

The level corresponding to a facial expression of a person is denoted by "Flvl".

By using Kr, Ka, and Ks, Flvl can be calculated from Equation 6.

$$Flvl = Kr \times Ka \times Ks \qquad (6)$$

Figure 12:
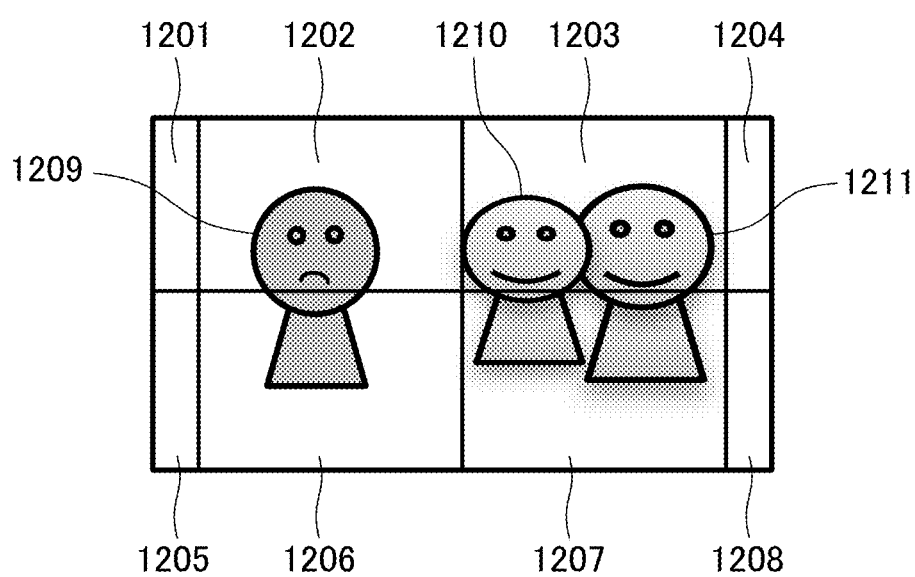
FIG. 12 is a diagram for explaining a person detection for each area in the captured image.

A level setting example corresponding to the person information will be explained with reference to FIG. 12. FIG. 12 shows an example of a plurality of areas 1201 to 1208 divided into areas, and subject areas 1209 to 1211, corresponding to each of the three persons. Areas 1201, 1204, 1205, and 1208 indicate areas in which the range shown on the screen is relatively small. Such areas are not deemed to be areas to be searched for a subject. The first person corresponding to subject area 1209 is assumed to be a subject who has not been registered with individual face authentication and to be a subject without a smile on the facial expression. The second person corresponding to subject area 1210 is assumed to be a subject who has not been registered with individual face authentication and to be a subject with a smile on the facial expression. The third person corresponding to subject area 1211 is assumed to be a subject who has been registered with individual face authentication and to be a subject with a smile on the facial expression.

Because the first person (subject area 1209) is captured in the areas 1202 and 1206, level setting is performed in both areas according to person information of the first person. Individual authentication registration information with respect to the first person is referred to, and it is found that individual authentication registration has not been performed. In this case, for example, the value of Ka is 1, and because there is no smile on the facial expression, the value of Ks is 1. Flvl=Kr, and the face reliability determines the subject importance level of the subject area 1209.

Because the second and third persons (subject areas 1210 and 1211) are captured in areas 1203 and 1207, level setting is performed in both areas according to the person information of the second and third persons. The registration information of the individual authentication with respect to the second person is referred to, and it is found that individual face authentication registration has not been performed. In this case, for example, the value of Ka is 1, and because there is a smile on the facial expression, Ks is set to a value greater than or equal to 1. Further, the registration information of the individual authentication with respect to the third person is referred to, and it is found that individual face authentication registration has been performed. In this case, for example, the value of Ka is greater than or equal to 1, and because there is a smile on the facial expression, Ks is set to a value greater than or equal to 1. Accordingly, in a case in which the degree of face reliability is the same for subject areas 1209, 1210, and 1211, the magnitude of the importance level of each subject corresponds to the relationship "importance level of subject area 1211 >importance level of subject area 1210>importance level of subject area 1209".

Furthermore, the control unit 212 performs level division according to the proportion of a face shown on the screen. In areas in which the proportion of the face image in the image is greater than a threshold value, the calculated importance level is directly set, and in areas in which the proportion of the face image in the image is less than a threshold value, the importance level is changed according to the proportion of the face image. For example, in FIG. 12, the proportion of the face image of persons in areas 1203 and 1207 is "8:2". In this case, in this case, the ratio of the importance levels of area 1203 and area 1207 is set to "10:2.5". In this manner, in (A), the importance level can be set for each area based on the face information of a person.

Next, (B) will be explained. The control unit 212 performs importance level setting based on object recognition information. For example, the importance level is set according to the result of general object category recognition, such as for a dog or cat, or subject recognition based on the degree of match between the image of the detected subject and an image of a subject that has been registered in advance. Object recognition includes, for example, a method of configuring discriminators for dog, cat, or the like according to a learning algorithm typified by neural networks.

Figure 13:
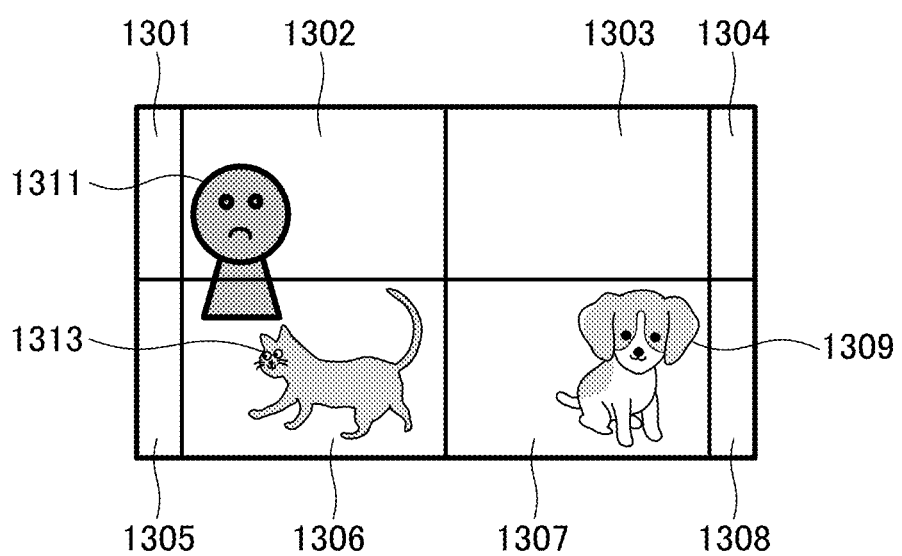
FIG. 13 is a diagram for explaining the object detection for each area of the captured image.

Importance level setting corresponding to object recognition information registered in advance will be explained with reference to FIG. 13. FIG. 13 shows an example of divided areas 1301 to 1308 and three subject areas 1309, 1311, and 1313. The subject area 1309 is an area that is determined to be a dog by object recognition, and the subject area 1313 is an area that is determined to be a cat by object recognition. The subject area 1311 is an area that is determined to be a person. Because the person is determined by the above-described (A), the person is excluded from targets of importance level setting according to the object recognition information. The importance level of each subject in a case in which the subject is recognized as a dog or in a case in which the subject is recognized as a cat is registered in advance. For example, assume a case in which a dog is set as an important subject, and a cat is set as not an important subject. In this case, the importance level of the area 1307 in which a dog is detected is set higher than the importance level of the area 1306 in which a cat is detected. Further, the control unit 212 can calculate the reliability of object recognition, and change the importance level according to the reliability. Also in (B), it is possible to perform level division according to the proportion of the subject that is shown on the screen. In an area in the image having the largest proportion of the subject image, the obtained importance level is directly set, and in an area of the image having a small proportion of the subject image, the importance level is changed according to the proportion thereof.

Next, (C) will be explained. The control unit 212 performs analysis of the image data and performs setting of the importance level based on the scene. Determination of, for example, a "natural verdure scene," a "blue sky scene," an "evening view scene," and the like is performed by analyzing image data. A "natural verdure scene" is, for example, a scene in a natural wooded area with a large proportion of green areas. With respect to the determination of scenes concerning the sky, the absolute angle information of the camera can be used. Because information on the tilt of the camera can be obtained from the absolute angle information, it is possible to determine whether or not the camera posture is one in which a range of the upper direction than a direction perpendicular to the direction of gravitational force is captured. In a case in which it is determined that the camera posture is one in which a range of an upward direction is captured, a determination such as a "blue sky scene" or an "evening view scene" is performed.

The control unit 212 performs processing to divide 12-bit RAW data of one frame of a captured image into blocks of n×m (n and m being variables representing a natural number) areas. The control unit 212 calculates the average values of pixels of teach color of R (red), G (green), and B (blue) of each block divided area. The image processing unit 206 performs temporary development processing by white balance correction processing, gamma correction processing, and color conversion matrix processing on the R, G, and B average values of each area.

In "blue sky scene" determination processing, the proportion of blocks in the blue area (hereafter referred to as "blue sky blocks") of an upper direction area of the screen is calculated. In the processing to determine whether a block is a blue sky block, a blue sky determination area is defined on the UV color space, and processing is executed to count the number of blue sky blocks in the area and compare the count to a threshold value. In "evening view scene" determination processing, the proportion of blocks in the red area (hereafter referred to as "evening view blocks") of an upper direction area of the screen is calculated. In the processing to determine whether a block is an evening view block, a night view determination area is defined on the UV color space, and processing is executed to count the number of evening view blocks in the area thereof and compare the count to a threshold value. Furthermore, in "natural verdure scene" determination processing, the proportion of blocks of the green area to all blocks in the screen is calculated. In the processing to determine whether a block is a block of a green area, a green determination area is defined on the UV color space, and processing is executed to count the number of blocks of a green area in the area thereof and compare the count to a threshold value. In any of the determination processing, it is possible to determine that a scene is a corresponding scene in a case in which the total count value is equal to or greater than a threshold value.

Figure 14:
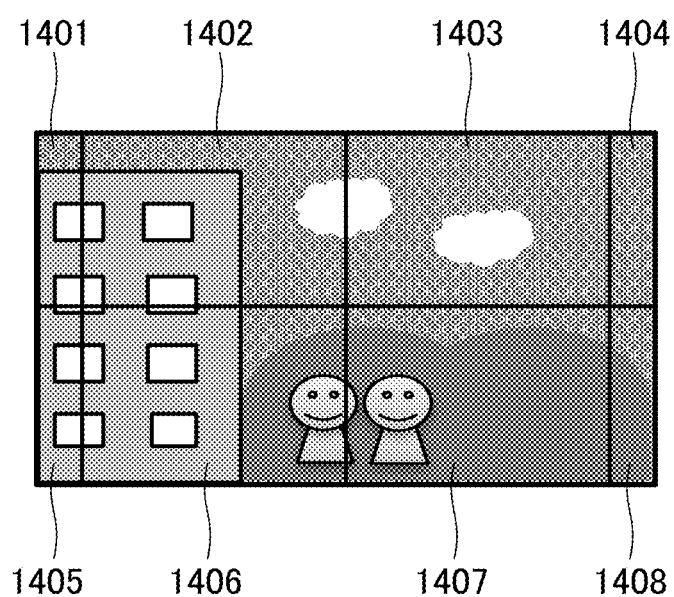
FIG. 14 is a diagram for explaining scene detection for each area of the captured image.

A specific example in (C) is explained with reference to FIG. 14. FIG. 14 shows an example of divided areas 1401 to 1408. Assume a scene in which blue sky is shown in the upper right range of the screen, a building is shown in the left range of the screen, and a natural object (green object) is shown in the lower right range of the screen. A "blue sky scene" and a "natural verdure scene" are detected by the scene determination. The control unit 212 sets the importance level corresponding to the blue sky area recognition in area 1403, and sets the importance level corresponding to the green area recognition in area 1407. For example, with respect to an area 1402, assume that the proportion of the blue sky area to the area is 40%. In area 1402, 40% is set as the importance level corresponding to the blue sky area recognition. With respect to an area 1406, assume that the proportion of the green area to the area is 30%. In area 1406, 30% is set as the importance level corresponding to the green area recognition.

Although the scene determination method using color space information has been explained above, there is also a method of determining a scene based on a luminance value. An example of a "night view scene" determination will be explained. Based on the histogram of luminance distribution of the entire screen, a scene having a luminance distribution that is configured by only the levels of luminance equal to or higher than a threshold value and lower than a threshold value can be determined to be a "night view scene". Furthermore, there is a method of using a contrast evaluation value calculated based on high-frequency components of the luminance signal of an image. A point light source (such as a light object or celestial body) can be determined by a contrast evaluation value, and whether the scene is a "night scene" can be determined by using a luminance distribution and a result of the detection of the point light source.

The data of importance levels corresponding to the scene determination results ("blue sky scene," "evening view scene," "nature verdure scene," "night view scene," and the like) are registered in advance in a storage unit (not shown). The control unit 212 can set an importance level for each area of the image based on the importance level corresponding to a scene determination result.

Next, (D) will be explained. The control unit 212 performs determination by analyzing speech information, and performs setting of the importance level based on the determination result. For example, the control unit 212 performs determination of a speech direction, a sound level, a speech recognition, and the like, based on the audio signal from the audio input unit 210. The setting of the importance level corresponding to the acquired speech information will be explained with reference to FIG. 15.

Figure 15:
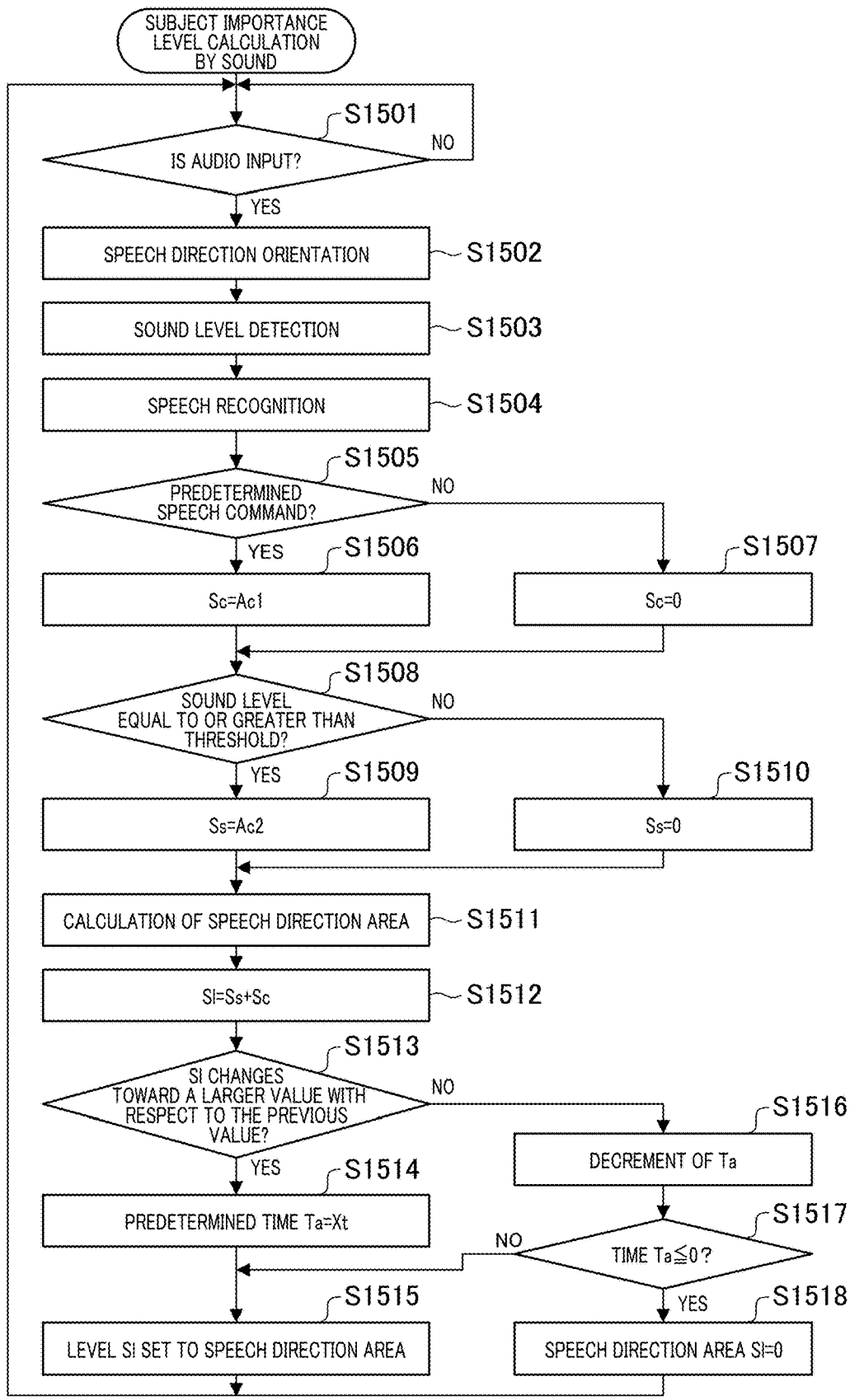
FIG. 15 is a flowchart for explaining a computation based on voice information.

FIG. 15 is a flowchart showing a processing example in (D). The following processing is performed according to a control program executed by the CPU of the control unit 212. At step S1501, the control unit 212 determines whether or not an audio signal from an external utterance has been acquired by the audio input unit 210. In a case in which an audio signal has been acquired, the processing proceeds to step S1502, and in a case in which no audio signal has been acquired, the processing of S1501 is repeatedly executed.

The control unit 212 includes a speech direction detection function, a sound level detection function, and a speech recognition function. Each function is implemented by executing a control program. At step S1502, the control unit 212 detects the direction of the origin of the audio signal by the speech direction detection function. Next, in step S1503, the control unit 212 detects the sound level of the audio signal by the sound level detection function. In step S1504, the control unit 212 recognizes speech based on the audio signal by the speech recognition function. Next, the processing proceeds to step S1505.

At step S1505, the control unit 212 determines whether or not the recognized speech is a predetermined speech command for speech recognition (speech recognition command). In a case in which it is determined that it is a speech recognition command, the processing proceeds to step S1506, and in a case in which it is determined that it is not a speech recognition command, the processing proceeds to step S1507. At step S1506, the control unit 212 sets the level of the speech recognition command (denoted by "Sc") to Ac1. Furthermore, at step S1507, the control unit 212 sets SC to zero. After either step S1506 or step S1507, the processing proceeds to step S1508.

At step S1508, the control unit 212 determines whether or not the sound level that was detected in step S1503 is equal to or greater than a predetermined value (threshold value). In a case in which it is determined that the detected sound level is equal to or greater than the threshold value, the processing proceeds to step S1509, and in a case in which it is determined that the sound level is less than the threshold value, the processing proceeds to step S1510. At step S1509, the control unit 212 sets the speech level (denoted by "Ss") to Ac2. At step S1510, the control unit 212 sets Ss to zero. Following step S1509 or step S1510, the processing proceeds to step S1511.

At step S1511, the control unit 212 calculates a speech direction area based on the direction of the speech detected at step S1502 (the direction of the origin of the speech signal). The speech direction area is an area corresponding to the speech direction. For example, the control unit 212 considers the recognition error in the speech direction, and uses the detected angle in the speech direction as a reference to set an area corresponding to the entire+45-degree range as the speech direction area. Next, at step S1512, the control unit 212 calculates the total sound level (denoted by "Sl") by adding the level Sc of the speech recognition command and the speech level Ss. Next, the processing proceeds to step S1513.

At step S1513, the control unit 212 performs a condition-determination with respect to the total sound level Sl. The condition in step S1513 is that the current Sl has changed to a larger value with respect to the Sl at the time of the preceding sampling. In a case in which this condition is satisfied, the processing proceeds to step S1514, and in a case in which this condition is not satisfied, the processing proceeds to step S1516.

At step S1514, the control unit 212 sets a time count value Xt to a predetermined time parameter (denoted by "Ta"), and the processing proceeds to step S1515. At step S1515, the control unit 212 sets the total sound level Sl to the speech direction area calculated in step S1511, and the processing proceeds to step S1501.

At step S1516, the control unit 212 performs a decrement of the predetermined time parameter Ta, and the processing proceeds to step S1517. At S1517, the control unit 212 determines whether or not the value of the predetermined time parameter Ta is equal to or less than zero. In a case in which the Ta value is equal to or less than zero, that is, in a case in which a time equivalent to the Ta value has elapsed since the time when Sl changed to a larger value, the processing proceeds to step S1518. In a case in which the Ta value is greater than zero, the processing proceeds to step S1515. At step S1515, the control unit 212 sets the total sound level Sl computed up to this point as the importance level corresponding to the speech information with respect to the speech direction area. At step S1518, the control unit 212 sets the total sound level Sl to zero. At step S1511, an Sl value (=0) is set with respect to the speech direction area. Then, the processing proceeds to step S1501.

Next, (E) will be explained. The control unit 212 determines whether or not a moving subject (moving body) is present in each of the divided areas (refer to FIG. 9), and performs setting of an importance level corresponding to motion information of the image. The control unit 212 performs difference detection between frames, motion vector detection between frames, and the like for each divided area. As a method of detecting a motion vector, there is a method for calculating an image motion amount from the relative displacement information of the images by dividing the screen into a plurality of areas, and comparing the areas within two consecutive images in time series. For example, two images are an image of one frame prior to the current image that is stored in advance, and a current image. The difference between the camera absolute angle and the rotational positions of the tilt rotation unit 104 and pan rotation unit 105 can be used to determine the angle of the lens barrel 102 in the direction of the optical axis of the image capturing plane. Thus, the motion vector value of the image blur due to the effect of camera angle change can be detected from a difference in the angle of the lens barrel 102 between frames.

FIG. 16 is an explanatory diagram of motion detection in a captured image. FIG. 16A schematically shows a plurality of areas 1601 that are subdivided by further division within a divided area. The control unit 212 detects movement pixels between frames in the divided area 1601. The control unit 212 performs frequency distribution calculation processing based on vector signals obtained by subtracting the motion vector value affected by a change in camera angle from the detected movement pixels. It should be noted that because motion vector detection is difficult, such as in a case in which an image has low contrast, vector information of blocks in which detection is not possible is not reflected in the frequency distribution calculation processing. FIGS. 16B and 16C show examples of frequency distributions. The horizontal axis represents a movement amount (unit: pixel) corresponding to the motion vector value, and the vertical axis represents a frequency corresponding to the movement amount.

FIG. 16B shows an example of the frequency distribution in a frame in a case in which no motion subject is present in a certain area. A threshold value range 1602 on the horizontal axis is a range in which the movement amount is small, and there is almost no motion in the subject. Therefore, motion vector information in the threshold value range 1602 is not used. A frequency threshold value 1603 is a threshold value with respect to the frequency of the vertical axis. The control unit 212 determines that a motion subject is present in an area in a case in which the frequency corresponding to the movement amount in a range other than the threshold value range 1602 exceeds the frequency threshold value 1603. In the example of FIG. 16B, because the frequency corresponding to the movement amount does not exceed the frequency threshold value 1603 in a range other than the threshold value range 1602, it is determined that there is no motion subject present.

FIG. 16C shows a frequency distribution example in a certain frame in a case in which a motion subject is present in a certain area. Because the frequency corresponding to the movement amount exceeds the frequency threshold value 1603 in a range other than the threshold range 1602, the control unit 212 determines that a motion subject is present in the area. In a case in which the control unit 212 determines that a motion subject is continuously present during a predetermined number of frames in the past, the control unit 212 performs setting of the importance level corresponding to "motion subject present".

Next, (F) will be explained. The control unit 212 performs setting of the importance level based on image capturing information acquired in the past (hereinafter referred to as "past image capturing information"). The camera 101 performs pan/tilt driving (hereinafter referred to as PT driving) to perform automatic search of the subject according to a method described below. The camera 101 starts automatic image capturing by detecting an automatic image capturing trigger based on the image information being automatically searched. The automatic image capturing trigger is based on, for example, the detection of a facial expression, such as a smile of a person, or on the final subject importance level, which will be described below. In addition, in a case in which the photographer manually instructs the camera to start image capturing by operating the release SW (switch) and the like provided on the camera 101, the image capturing operation is started in accordance with the operation instruction signal. When the camera 101 starts an image capturing operation, the control unit 212 carries out management by storing past image capture information in a memory.

First, setting the importance level corresponding to past image capturing information for each divided area will be explained. The control unit 212 performs storage and management of the number of captured images in each divided area as shown in FIG. 9. A method of management of past image capturing information is explained with reference to FIG. 17.

FIG. 17 shows an example of a plurality of areas (AreaN: N=1, 2, . . . ) and the number of captured images corresponding to a plurality of time periods. Control unit 212 manages the number of captured images in each time period for each area. FIG. 17 shows as time periods only the segments "Present time to Time T1," "Time T1 to time T2", "Time T2 to time T3", and "Time T3 to time T4". The control unit 212 sets the importance level for each area based on the past image capture information for each area. "Present time to Time T1" represents a first period from the present time to the past time T1. The weight coefficient value corresponding to the number of captured images in the first period is set to, for example, 1. "Time T1 to Time T2" represents a second period from the past Time T1 to the past Time T2. The weight coefficient value with respect to the number of captured images in the second period is set to, for example, 0.8. "Time T2 to Time T3" represents a third period from the past Time T2 to the past Time T3. The weight coefficient value for the number of captured images in the third period is set to, for example, 0.5. "Time T3 to Time T4" represents a fourth period from the past Time T3 to the past Time T4. The weight coefficient value for the number of captured images in the fourth period is set to, for example, 0.2. In this case, the control unit 212 multiplies the respective weight coefficients by the number of captured images, and the results of the calculations in each time period are added together. That is, the weighted total number of captured images in each area is calculated.

Specifically, with respect to Area1, the number of captured images in the first to the fourth periods are, respectively, 0, 0, 0, and 2. The values of the weight coefficients in the first to fourth periods are, respectively, 1, 0.8, 0.5, and 0.2. Thus, the total number of captured images in Area 1 is 0×1+0×0.8+0×0.5+2×0.2=0.4 (images). Similarly, the total number of captured images for Area 3 is 3×1+4×0.8+2×0.5+0×0.2=7.2 (images). The control unit 212 multiplies the total number of captured images of each area by a level coefficient, and performs the importance level setting corresponding to the past image capture information for each area. The value of the level coefficient is a negative value, and the importance level is assumed to decrease as the number of captured images increases.

Furthermore, the past image capturing information is also fed back to the settings in the above described (A) to (C), and the like, and also affects the setting of each importance level. A specific explanation will be provided with reference to FIG. 18. FIG. 18 shows an example of past shooting information for feeding back to the above-described (A).

As shown in FIG. 18, the control unit 212 stores and manages the past number of captured images for each individually registered subject (Asan, Bsan, Csan, Dsan . . . ) over a plurality of time periods. Similar to the method explained in FIG. 17, a weight coefficient is set in each time period, and each of the total number of captured images is calculated for each of the registered subjects. A result obtained by multiplying the total number of captured images by a level coefficient for level setting is added to Ka, thereby providing feedback of the past image capturing information in the above described (A). It should be noted that the value of the level coefficient is a negative value, and the level decreases as the number of captured images increases, but the value of Ka is set so that it does not become equal to or less than zero.

FIG. 19 shows an example of past image capturing information for feedback to the above described (B). The control unit 212 stores and manages the number of past captured images of each registered subject (dog, cat . . . ) over each of a plurality of time periods. Similar to the method explained in FIG. 17, a weight coefficient is set in each time period, and the respective total number of captured images is calculated for each registered subject. A result obtained by multiplying the total number of captured images by a level coefficient for level setting is added to the subject importance level corresponding to each subject, and the past image capturing information is fed back in the above described (B).

FIG. 20 shows an example of past image capturing information for feedback to the above described (C). The control unit 212 stores and manages the number of past image captured images of each scene over each of a plurality of time periods. Similar to the method explained in FIG. 17, a weight coefficient is set in each time period, and the total number of captured images is calculated for each scene. The past image capturing information is fed back in the above described (C) by multiplying the total number of captured images by a level coefficient for level setting, and adding the result to the importance level corresponding to each scene.

The value of the level coefficient in the above described (B) and (C) is a negative value, and the level decreases as the number of captured images increases, but the subject (object) and the importance level corresponding to the scene are set so that the level does not become equal to or less than zero.

Next, (G) will be explained. The control unit 212 performs importance level setting according to unsearched time. The unsearched time corresponds to the elapsed time from the time at which the subject search was last performed in a divided area. The flow of the processing will be explained with reference to FIG. 21.

Figure 21:
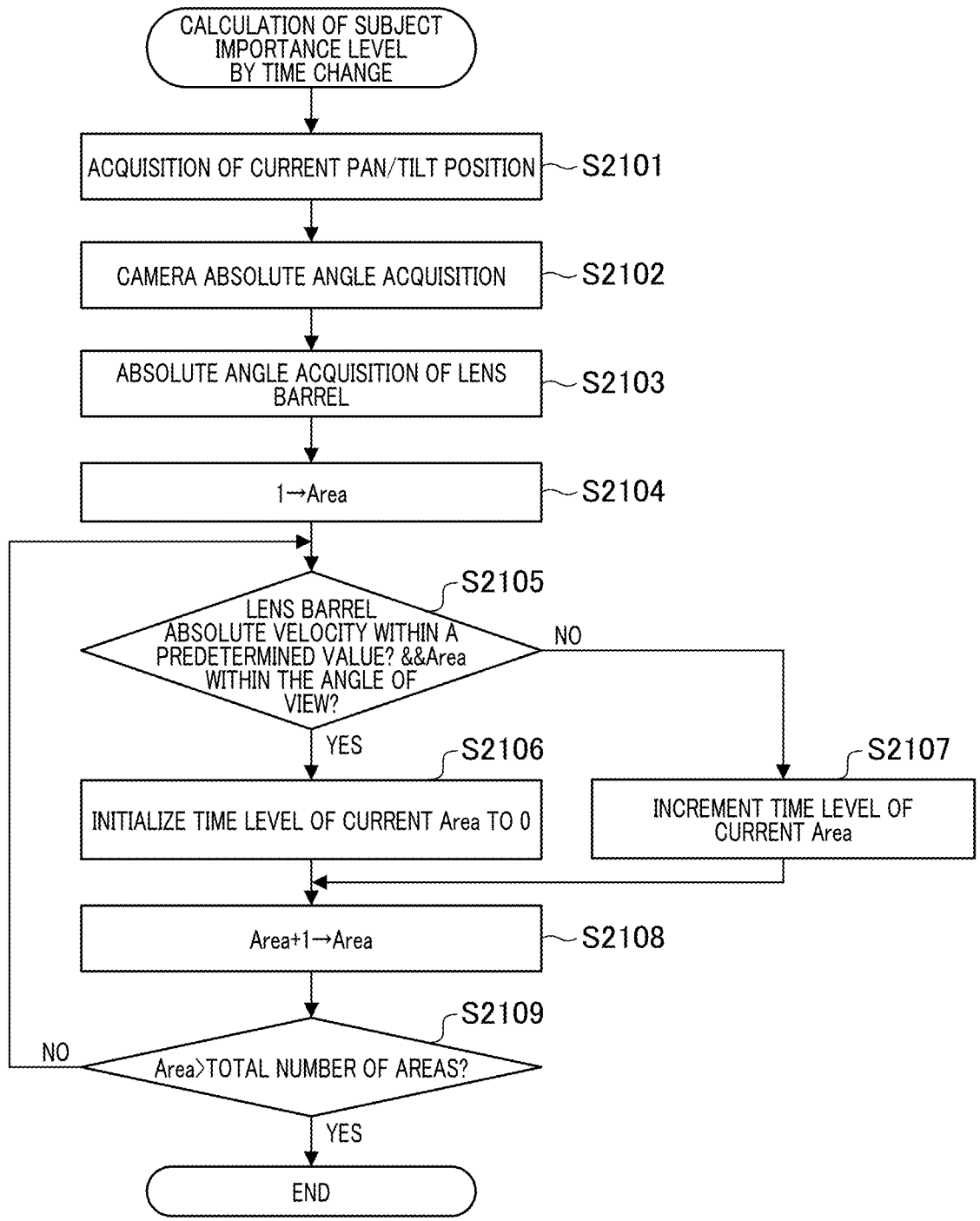
FIG. 21 is a flowchart explaining a computation based on search elapsed time.

FIG. 21 is a flowchart showing a processing example in the above described (G). The following processing is performed according to a control program executed by a CPU of the control unit 212. At step S2101, the control unit 212 acquires the pan/tilt position, which is the detection information of the current position and posture information of the camera 101, and the processing proceeds to step S2102. In step S2102, the camera absolute angle that has been calculated by the above described method is acquired. Next, at step S2103, the control unit 212 calculates the absolute angle of the lens barrel 102 based on the pan/tilt position acquired at step S2101 and the camera absolute angle acquired at step S2102, and the processing proceeds to step S2104.

At step S2104, the control unit 212 substitutes 1 for the variable for the loop computation (denoted by "Area"), and the processing proceeds to step S2105. At step S2105, the control unit 212 calculates the absolute angular velocity by performing differential processing on the absolute angle of the lens barrel 102. The control unit 212 determines whether or not the calculated absolute angular velocity is within a predetermined angular velocity (first condition determination). The predetermined angular velocity is a threshold value that is determined in advance, and corresponds to an angular velocity at which the absolute angular velocity of the lens barrel 102 is sufficient to be detectable. For example, taking into consideration the delay in image capturing and the delay in detection time, a threshold value is set such that the delay time from the image to the performance of subject detection is within a predetermined value. With respect to the first condition, in a case in which the absolute angular velocity of the lens barrel 102 is within a predetermined angular velocity, a positive determination result is obtained, and in a case in which the absolute angular velocity of the lens barrel 102 is not within a predetermined angular velocity, a negative determination result is obtained. Furthermore, an area number is defined for each of the divided areas (refer to FIG. 9). The control unit 212 determines whether the value of the variable Area is an area number of an area on the screen (second condition determination). With respect to the second condition, in a case in which the value of the variable Area is an area number of an area on the screen, a positive determination result is obtained, and in a case in which the value of the variable Area is not an area number of an area on the screen, a negative determination result is obtained. In a case in which the first and second conditions are satisfied in step S2105 (both positive determination results), the processing proceeds to step S2106. In a case in which the first or second condition is not satisfied (at least one of which is a negative determination result), the processing proceeds to step S2107.

At step S2106, the control unit 212 sets the importance level (time level) corresponding to the unsearched time for the current variable Area to be zero. Furthermore, at step S2107, the control unit 212 performs incrementing of the time level with respect to the current variable Area. After step S2106 or step S2107, the processing proceeds to step S2108. In step S2108, incrementing of the variable Area is performed. Thereafter, the processing proceeds to step S2109, and the control unit 212 determines whether or not the value of the variable Area is greater than the total number of areas. In a case in which the value of the variable Area is greater than the total number of areas, the processing is terminated. In a case in which the value of the variable Area is equal to or less than the total number of areas, the processing shifts to step S2105, and the processing of steps S2105 to S2109 is repeatedly executed.

According to the above method, the control unit 212 sets the importance level corresponding to an unsearched time for each divided area. When the elapsed time from the time when a subject search was last performed with respect to a target area (unsearched time) becomes longer, the time level of each area becomes larger. Because the subject importance level of an area in which a subject search has not been performed for a long period of time increases, a subject search will be performed in that area by PT driving.

Next, (H) will be explained. The control unit 212 performs setting of the importance level corresponding to a camera vibration state. By the camera state determination that was calculated in step S609 of FIG. 6, determination results such as "stationary capturing state", "vehicle detection state", "handheld state", and the like, are acquired as the camera vibration state.

In a case in which it is determined that the camera vibration state is a "stationary capturing state", the possibility of an erroneous computation of the camera absolute angle is low, and the reliability of the computation of the importance level with respect to each area is high. Thus, the control unit 212 directly uses the subject importance level for each area that has already been computed, and performs subsequent subject search control.

In a case in which it is determined that the camera vibration state is a "vehicle detection state," while there is little change in a passenger, which is a subject in a vehicle with a large movement velocity, an external subject such as a landscape changes from moment to moment. Thus, the control unit 212 directly uses the importance level corresponding to person information according to the above described (A), but does not use the importance level corresponding to image motion information according to the above described (E). In addition, the importance level corresponding to object recognition information according to the above described (B) and the importance level corresponding to scene according to the above described (C) are likely to change immediately. Thus, the control unit 212 relatively lowers these importance levels. However, in automatic image capturing, control is performed so that the image capturing operation is started immediately after the detection of the camera vibration state. Furthermore, the control unit 212 directly uses the importance level corresponding to speech information according to the above described (D), and the importance level corresponding to past image capturing information according to the above described (F). In addition, the traveling direction of the camera 101 is detected, and the acceleration in the traveling direction during high-speed movement is detected by the acceleration meter 107. The control unit 212 performs a computation to increase the importance level with respect to an area corresponding to the traveling direction.

In a case in which it is determined that the camera vibration state is a "handheld state", there is a high possibility that the photographer will perform a change operation of the camera direction (image capturing direction), and there is a possibility that the vibration, such as hand shaking, becomes a large state. Then, the control unit 212 sets the importance level with respect to a first area having a ±45-degree angular range from the camera normal position, in which the angular range in the tilting direction and the panning direction are both 0 degrees, to be relatively large. Furthermore, the control unit 212 sets the importance level with respect to a second area having a range of ±45 degrees to ±90 degrees to be relatively small. Then, the control unit 212 sets the importance level to be even smaller than that in the second area in a third area having a range that is separated by more than ±90 degrees. The control unit 212 adds the importance levels for each area, or multiplies the importance levels calculated for each area by the weight coefficients corresponding to the respective angular ranges. For example, the value of the first weight coefficient with respect to the first area is 1, and the value of the second weight coefficient with respect to the second area is less than 1. The value of the third weight coefficient with respect to the third area is further smaller than the value of the second weight coefficient.

According to the above method, the control unit 212 changes the computation of the subject importance level corresponding to the camera vibration state, and performs control so that a subject search matching the detected camera vibration state is performed. The control unit 212 performs addition (simple addition or weighted addition) of each importance level to calculate the subject importance level based on the importance level in each area determined by the above described (A) to (H).

Next, the target angle calculation of subject search by PT driving (step S614 in FIG. 6) will be explained. First, the control unit 212 calculates an importance level for subject search (final level for search) based on the subject importance levels of the divided, adjacent areas. A specific explanation will be provided with reference to FIG. 22.

Figure 22A:
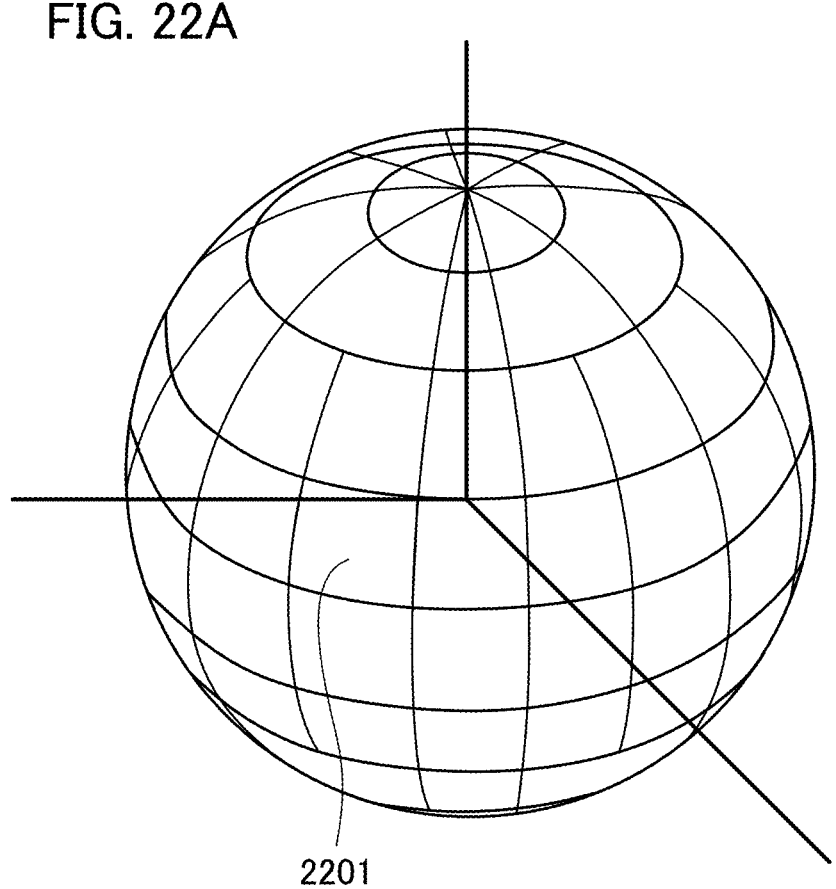
FIG. 22A and FIG. 22B are diagrams for explaining a search target angle computation for each scene.
Figure 22B:
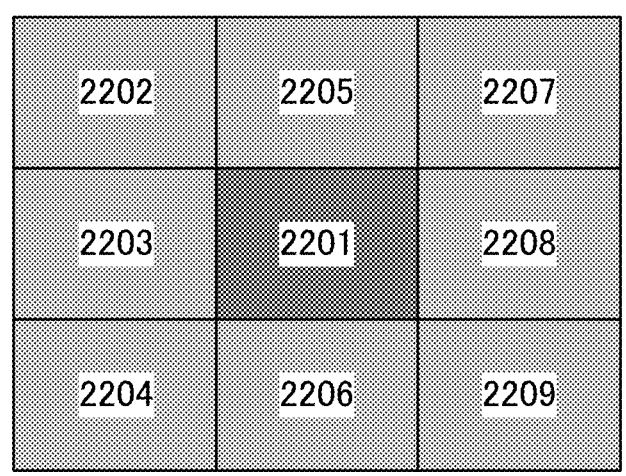

FIG. 22 is a diagram for explaining the computation of the search target angle of each scene. In FIG. 22A, an area 2201 is one of a plurality of areas divided by the method described above, and is the target area for the computation. FIG. 22B shows the area 2201, and peripheral areas 2202 to 2209 adjacent thereto. The final level for search in area 2201 is calculated by using the information of area 2201 and its peripheral areas 2202 to 2209. For example, assume the value of the weight coefficient for the area 2201 is 1, and the value of the weight coefficient for the peripheral areas 2202 to 2209 is equal to or less than 1 (for example, 0.5). The control unit 212 multiplies the subject importance levels for each area by the respective weight coefficients, and calculates the final level for search by adding the calculated values obtained in all areas. A computation is performed in all areas, and the final level for search in each area is calculated.

Next, the control unit 212 sets the area having the highest final level for search as the search target area. Assume a case in which the search target area is the area 2201 of FIG. 22. The target angle (denoted by "y") of subject search by PT driving is calculated by Equation 7 from the search final level and center angle of area 2201 and peripheral areas 2202 to 2209.

(Formula 7)

(Formula 7)

$$y = \sum_{i=1}^{n} \left( b_i \times \frac{a_i}{\sum_{i=1}^{n} a_i} \right) \quad (7)$$

The "n" in Equation 7 represents the number of areas, and in FIG. 22, it represents the number (9) of the areas 2201 to 2209. "i" is a variable defined for identifying each area, and in FIG. 22, the areas 2201 to 2209 are respectively assigned 1 to 9. "b" represents the center angle of each area. "$b_i$" represents the center angle of the i-th area. a represents the final level for search of each area. "$a_i$" represents the final level for search of the i-th area. "Σ" is a symbol of a summation operation based on the range (1 to n) of the variable i.

The control unit 212 performs weighted addition based on the final levels for search in the areas 2201 to 2209, and calculates a target angle y. The target angle y is computed in each of the tilting direction and the panning direction. This computation corresponds to a computation to determine the position of the center of gravity of an angle from the center angle of each area by using the ratio of the final level for search of each area to the sum of the final level for search of each area as a weight coefficient.

In a case in which the total value of the final level for search of each area is equal to or less than a predetermined threshold value, the control unit 212 determines that there is no important subject at that time even when the areas are searched. In this case, the PT driving of the camera 101 is not performed. Furthermore, the control unit 212 computes a target angle y based on a subject importance level calculated under a condition excluding the above described (F). After PT driving based on the target angle y has been performed, the camera 101 is held at an angular position corresponding to the target angle y until the time at which any one of the final levels for search in each area is greater than the predetermined threshold value.

Next, the calculation of the PT driving amount (step S615 in FIG. 6) will be explained. The control unit 212 calculates a PT driving amount calculation unit from the image blur correction amount obtained in step S607 and the target angle of subject search obtained up to step S614. The PT driving amount is calculated by adding the driving angle in the control sampling based on the image blur correction amount and the target angle of the subject search. Each of the panning driving angle and tilting driving angle is calculated based on the PT driving amount. At step S616, the lens barrel rotation driving unit 112 drives the tilt rotation unit 104 and pan rotation unit 105 according to the respective driving angles thereof. At step S617, the control unit 212 executes automatic following processing.

Figure 23:
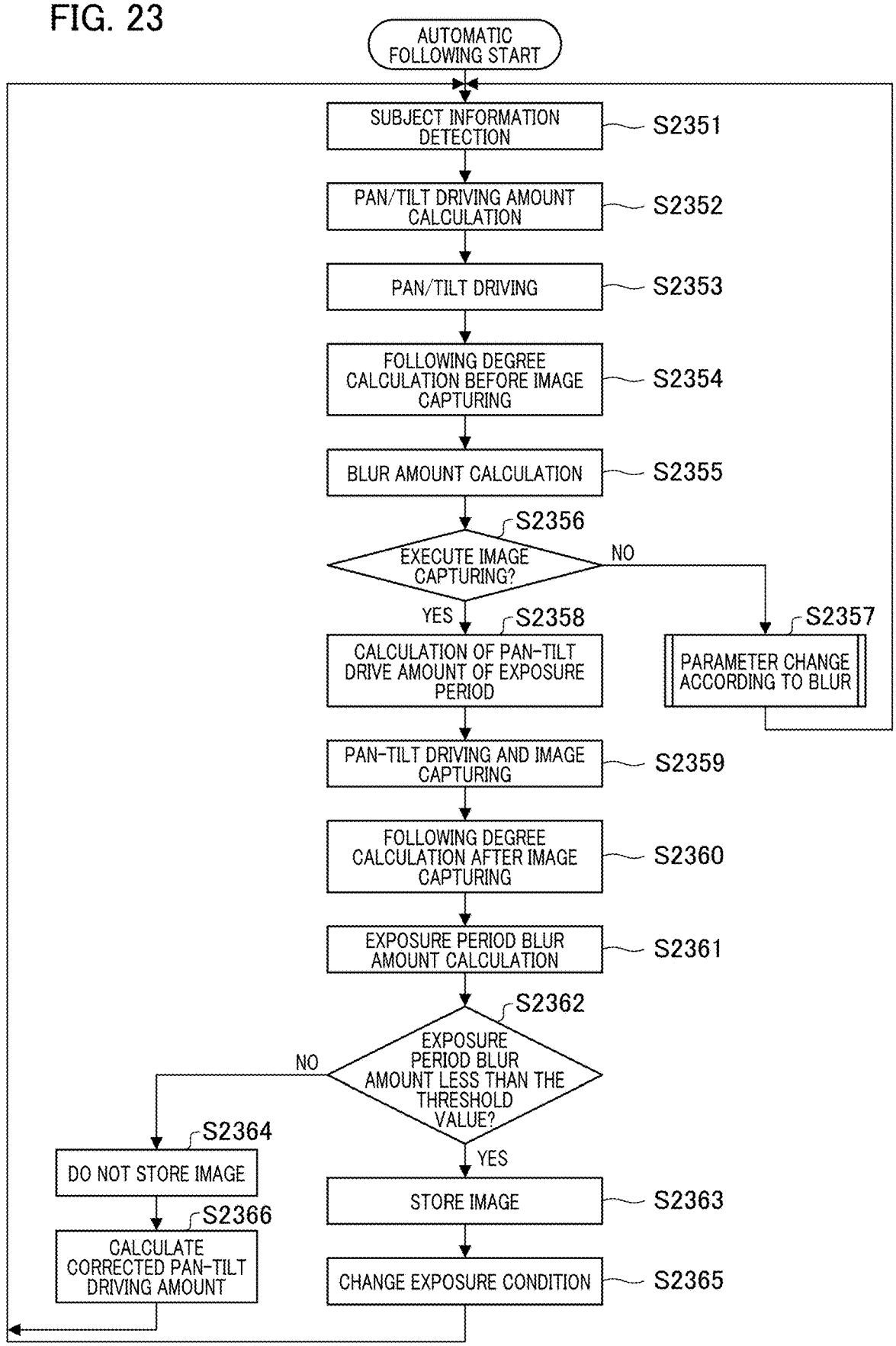
FIG. 23 is a flowchart explaining an automatic following control of the image capturing apparatus.

FIG. 23 is a flowchart explaining an example of an operation of automatic following. At step S2351, the control unit 212 executes processing for capturing subject information based on the detection results of the image processing unit 206, the zoom driving control unit 202, and the focus driving control unit 204. Subject information is information that is configured by at least one or more of the velocity and position of the subject, a motion vector around the subject, the distance between the subject and the image capturing apparatus (subject distance), the orientation of the subject, and the traveling direction of the subject.

A calculation method of each of the constituent elements that configure the subject information will be explained. The image processing unit 206 performs image processing, and generates an image for subject detection. A main subject area, which is the image area of a main subject, is detected. Based on the center of gravity of the main subject area, the position of the main subject on the image plane (hereinafter referred to as a subject position) is calculated. A subject movement amount on the image plane during one frame is calculated by the difference between this subject position and the subject position calculated in the image of one frame before the current image. The velocity of the main subject on the image plane (hereinafter referred to as "subject velocity") can be calculated by using the calculated subject movement amount on the image plane during one frame and the time required for one frame.

Next, a main subject area detected from an image one frame prior to the current image is used as a template, and template matching processing is executed between the template and the current main subject area. Thus, it is possible to detect the motion vector around the subject, and calculate the traveling direction of the subject from the motion vector. Furthermore, template matching processing of the template and the current main subject area is performed by using a template of the orientation of a subject that has been set in advance. Thus, it is possible to detect the orientation of the subject. For example, it is possible to determine whether or not the main subject is facing sideways by using a template of the facial profile of the subject. Next, the current position of the zoom lens (corresponding to a focal length f) detected by the zoom driving control unit 202, and the position of the focus lens detected by the focus driving control unit 204 are acquired. It is possible to calculate the distance between the subject in focus and the image capturing apparatus from the information of these positions.

When the subject information is acquired at step S2351, the processing proceeds to step S2352. It should be noted that, in a case in which the subject information cannot be acquired for reasons such as fade-out of the subject or an object other than the main subject crossing in front of the main subject, the processing returns to step S602 of FIG. 6, and automatic subject search, automatic following, and automatic image capturing processing are repeatedly executed.

In step S2352, the calculation processing of the PT driving amount is performed. A target position is set by the target position setting unit 1123 based on the subject position detected at step S2351. Next, the PT driving amount is calculated based on the control amount calculated by the PID computation unit 1124 and the sensitivity of the following by the following sensitivity setting unit 1126. A specific example of the calculation of the PT driving amount based on the control amount and the sensitivity of the following is described below. After step S2352, the processing proceeds to step S2353.

At step S2353, PT driving is performed. Each of the tilt rotation unit 104 and pan rotation unit 105 is driven based on the PT driving amount calculated at step S2352. The control unit 212 calculates the current PT driving information. For example, the PT driving information is information configured by one or more of a PT driving velocity, a PT driving position, and a movable range of PT driving.

A calculation method of each constituent elements that configure the PT driving information will be explained. First, the position computation unit 1122 calculates a rotational position (PT driving position) of the pan rotation unit 105 and the tilt rotation unit 104. The rotation amount of the pan rotation unit 105 and the tilt rotation unit 104 is calculated from the current PT driving position and the PT driving position detected one frame before. It is possible to calculate the PT driving velocity by using this rotation amount and the time required for one frame. Next, the difference between the position of a movable end of each of the tilt rotation unit 104 and the pan rotation unit 105 and the current PT driving position is calculated. This difference corresponds to the movable range of the PT driving. After calculation of the PT driving information, the processing proceeds to step S2354. However, in a case in which it is determined that the pan rotation unit 105 or the tilt rotation unit 104 has reached the driving end based on the movable range of the PT driving, the processing returns to step S602 of FIG. 6, and automatic subject search, automatic following, and automatic image capturing processing are repeatedly executed.

At step S2354, the control unit 212 calculates a following degree before image capturing. The following degree f at the exposure time t set in the electronic shutter control unit 213 is calculated. The following degree f is a value that indicates how accurately the following is performed with respect to the subject. The following degree f can be determined from a velocity difference between the subject velocity and the PT driving velocity. That is, when the velocity difference between the subject velocity and the PT driving velocity becomes small, the magnitude of the following degree becomes large. In contrast, when the velocity difference between the subject velocity and the PT driving velocity becomes large, the magnitude of the following degree becomes small. Furthermore, because the subject is used as a reference, in a case in which the subject velocity is larger than the PT driving velocity, the following degree f is a positive value, and in a case in which the subject velocity is smaller than the PT driving velocity, the following degree f is a negative value. A method of calculating the following degree fx is described below. After step S2354, the processing proceeds to step S2355.

At step S2355, the control unit 212 calculates a blur amount in each direction from the following degree in the panning direction and the tilting direction calculated at step S2354, and the exposure time t set in the electronic shutter control unit 213. The blur amount calculation method is described below. Next, at step S2356, the control unit 212 determines whether to execute image capturing. In a case in which it is determined to perform image capturing, the processing proceeds to step S2358. In a case in which it is determined to not perform image capturing, the processing proceeds to step S2357. At step S2357, the control unit 212 performs change processing of the exposure condition parameter corresponding to the blur. The control unit 212 sets the sensitivity of the following to the conversion unit 1127 by the following sensitivity setting unit 1126, and performs a change and setting of exposure conditions to the electronic shutter control unit 213. After step S2357, the processing proceeds to step S2351.

In step S2358, processing is performed to calculate the PT driving amount during the exposure period. The control unit 212 acquires a subject position based on the detection results of the image processing unit 206. Next, the position computation unit 1122 acquires a PT driving position of the pan rotation unit 105 and the tilt rotation unit 104. Similar to step S2352, the control unit 212 calculates the PT driving amount by using the subject position and the PT driving position. After step S2358, the processing proceeds to step S2359.

At step S2359, the control unit 212 performs image capturing while performing driving control with respect to each of the tilt rotation unit 104 and pan rotation unit 105 by the lens barrel rotation driving unit 112 according to the PT driving amount calculated in step S2358. An exposure time t set in the electronic shutter control unit 213 is used for the exposure time at this time. After the end of image capturing, the processing proceeds to step S2360.

Because the period immediately after the end of the exposure period is a signal readout period from an image capturing element, it is not possible to capture subject information. In step S2360, similar to step S2351, processing is performed to capture subject information after the signal readout is completed. Next, similar to step S2354, the subject information and the PT driving information are used to calculate the following degree in each of a panning direction and a tilting direction. After step S2360, the processing proceeds to step S2361.

At step S2361, the control unit 212 calculates the exposure period blur amount (denoted by "ebrx") by using the following degree before image capturing calculated at step S2354, and the following degree after image capturing calculated at step S2360. The exposure period blur amount is determination information for determining whether or not to store the data of the captured image on a recording medium. A calculation method of exposure period blur amount is described below. After step S2361, the processing proceeds to step S2362.

At step S2362, the control unit 212 determines whether or not the exposure period blur amount calculated at step S2361 is less than the threshold value. In a case in which the exposure period blur amount is less than the threshold value, the captured image is determined to be an image with minimal blurring, and the processing proceeds to step S2363. In a case in which the exposure period blur amount is equal to or greater than the threshold value, the captured image is determined to be a possible blurred image, and the processing proceeds to step S2364. At step S2363, the image recording unit 207 stores the data of the captured image on a recording medium, and the processing proceeds to step S2365. At step S2365, the control unit 212 changes an exposure condition corresponding to the ISO sensitivity value set by the electronic shutter control unit 213. For example, to improve image quality, the ISO sensitivity value is lowered, and the settings are changed so as to increase the exposure time t. Next, the processing proceeds to step S2351.

At step S2364, the image recording unit 207 does not record the data of the captured image on the recording medium, or deletes the image data recorded on the recording medium. Alternatively, the image processing unit 207 performs processing to score the image data recorded on the recording medium, and delete a plurality of pieces of image data having a score equal to or less than a predetermined value collectively at a later time. Next, at step S2366, the control unit 212 performs correction of the PT driving amount in order to lower the exposure period blur amount. The control unit 212 calculates a correction amount based on the difference between a predetermined threshold value and the exposure period blur correction amount, and determines the PT driving amount (correction PT driving amount) to be used in the next image capturing based on the calculated correction amount. Next, the processing proceeds to step S2351.

Figure 24:
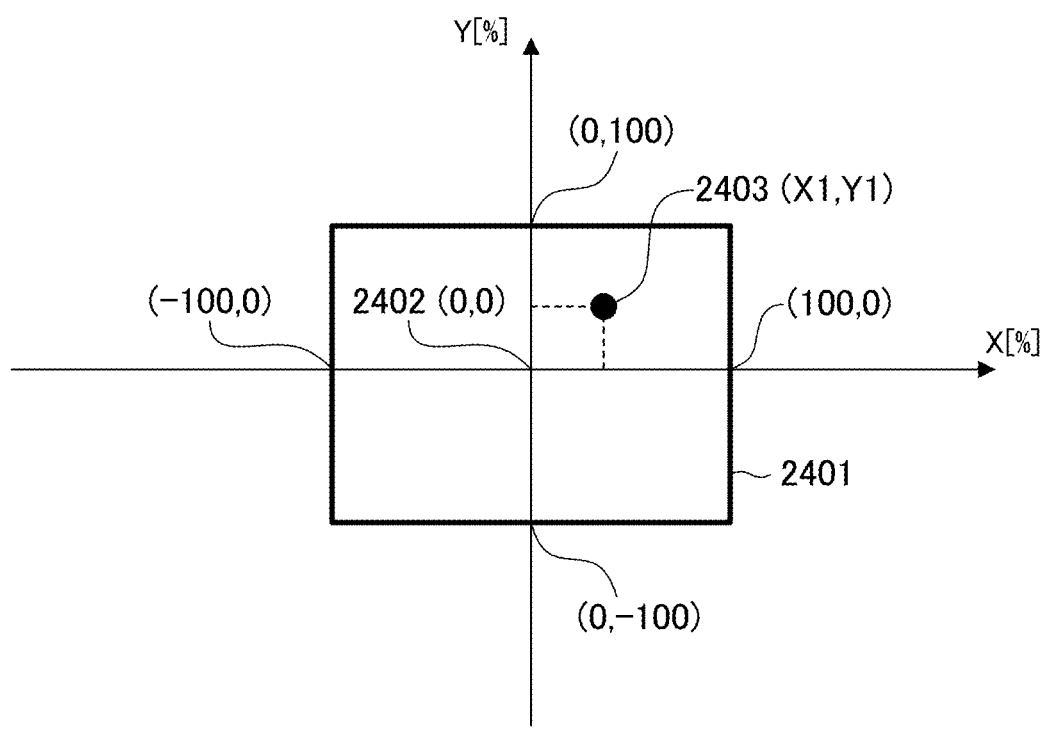
FIG. 24 is a diagram for explaining a target position computation at the time of automatic following.

Next, a method of calculating the PT driving amount in step S2352 of FIG. 23 is explained below. A method of calculating the target position set by the target position setting unit 1123 will be explained with reference to FIG. 24. FIG. 24 is a diagram showing an image capturing plane 2401 and an XY coordinate system. The horizontal axis is defined as the X-axis and the vertical axis is defined as the Y-axis. The origin (0, 0) of the XY coordinate system is defined as an image capturing plane center 2402. The coordinates of an arbitrary point in the XY coordinate system are denoted by "(X, Y)", in which X represents an X-axis relative coordinate component (%), and Y represents a Y-axis relative coordinate component (%).

In the image capturing plane 2401, the subject position acquired at step S2351 of FIG. 23 is shown in coordinate 2403. The coordinate 2403 is denoted by "(X1, Y1)". The target angle of the panning direction can be calculated by using Equation 8 and Equation 9 by the distance between two points in the XY coordinate system determined based on the image capturing plane center 2402 and coordinate 2403, and the focal length f of the zoom unit 201.

$$Xd = X1 - Xo \tag{8}$$

$$\theta xd = \mathrm{atan}(\alpha x \times Xd/f) \tag{9}$$

The definitions of the various quantities in Equation 8 and Equation 9 are shown below.

Xd: Distance from the image capturing plane center 2402 to the subject position (horizontal component)

X1: Subject position on the image capturing surface (horizontal component)

Xo: Horizontal component of the image capturing plane center 2402

αx: Horizontal component of the distance conversion coefficient

θxd: Target angle of the panning direction.

The atan( ) in Equation 9 represents an inverse tangent function.

A target angle of the tilting direction can also be calculated in a similar manner. The target position is calculated from the target angles in the panning direction and tilting direction.

Next, the PID computation unit 1124 calculates a control amount (denoted by "c") based on a deviation between the calculated target position and the current PT driving position obtained by the position computation unit 1122. The PT driving amount is denoted by "D", and the sensitivity of the following is denoted by s. The PT driving amount D is obtained by Equation 10, based on the calculated control amount c and the sensitivity of following s.

$$D = c \times s \quad (10)$$

Figure 25:
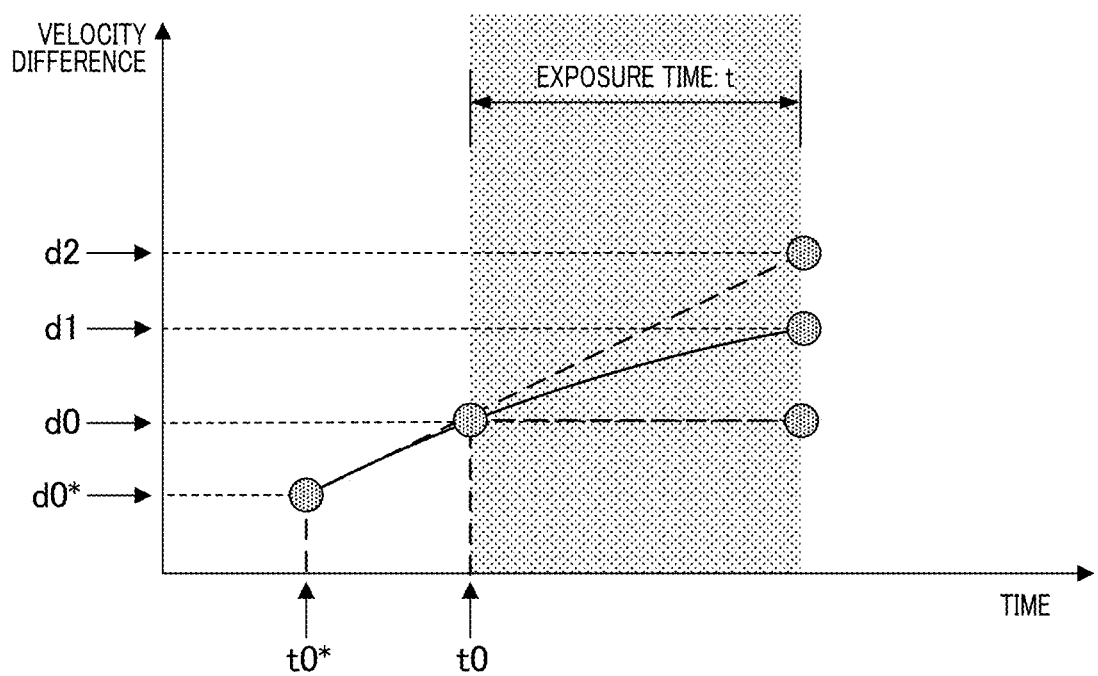
FIG. 25 is a diagram for explaining a following degree computation.

Next, referring to FIG. 25, a calculation method of the following degree will be explained. FIG. 25 is a diagram for explaining a calculation method of the following degree of the panning direction at an exposure time t set in the electronic shutter control unit 213. The horizontal axis is a time axis, and the vertical axis represents a velocity difference between the subject velocity in the panning direction and the driving velocity of the pan rotation unit. For example, the following degree of the panning direction (denoted by "fx") can be calculated from the difference in velocity between the velocity of the subject in the panning direction before the exposure and the driving velocity of the pan rotation unit.

In FIG. 25, a time t0 is a time immediately before exposure, and the exposure time is shown by t. d0 indicates a velocity difference between the subject velocity of the panning direction at time t0 and the driving velocity of the pan rotation unit. With respect to the velocity difference after a lapse of the exposure time t from the time t0 immediately before the exposure, it is possible to calculate a velocity difference d0 by assuming that the velocity difference d0 immediately before the exposure remains unchanged at the exposure time t (refer to the graph line with a velocity difference of d0). In this case, a following degree fx of the panning direction in an exposure time t is determined to be the velocity difference d0. Alternatively, it is possible to calculate the following degree fx by assuming that the velocity difference between the subject velocity of the panning direction and the driving velocity of the pan rotation unit changes to be constant at the exposure time t (refer to the inclined graph line). In this case, a time earlier than time t0 immediately before exposure is denoted by "t0*". d0* indicates a velocity difference between the subject velocity of the panning direction at a time t0* and the driving velocity of the pan rotation unit. d2 indicates a velocity difference after a lapse of an exposure time t from a time to, obtained by performing a linear interpolation with respect to d0* and a velocity difference d0 immediately before exposure. The following degree fx of the panning direction at the exposure time t can be calculated by an average computation of the velocity difference d0 and the velocity difference d2.

Alternatively, the following degree fx can be calculated by assuming that the velocity difference between the subject velocity of the panning direction and the driving velocity of the pan rotation unit is changed at an accelerated rate in the period of the exposure time t (refer to the solid graph line). In this case, d1 represents a velocity difference after the lapse of the exposure time t from the time t0, and is calculated based on an acceleration component between the velocity difference d0* at a past time t0* earlier than the time t0 and the velocity difference d0 immediately before exposure. The following degree fx of the panning direction at the exposure time t can be calculated by time integration based on the velocity difference d0 and the velocity difference d1.

Although a method for calculating the following degree fx of the panning direction has been explained, it is possible to calculate the following degree (denoted by "fy") in the tilting direction by a similar method. Furthermore, the following degree may be calculated by replacing the difference in velocity between the subject velocity and the driving velocity of the pan rotation unit (or tilt rotation unit) with a motion vector. In this case, based on a motion vector detected immediately before exposure and a motion vector detected at time earlier than immediately before exposure, the motion vector after the lapse of an exposure time t is calculated from the time immediately before exposure. A following degree fx (or fy) of the panning direction (or tilting direction) at the exposure time t is determined based on the calculation result of the motion vector. Alternatively, the following degree may be calculated by replacing the velocity difference between the subject velocity and the PT driving velocity with the distance between the two points from the center of the image plane to the subject position. After calculation of the following degrees fx and fy, the processing proceeds to step S2355 of FIG. 23. In step S2355, the blur amount of the panning direction is calculated from the following degree of the panning direction calculated in step S2354 and the exposure time t that has been set in the electronic shutter control unit 213.

A method for calculating the blur amount in step S2355 of FIG. 23 will be explained. The blur amount of the panning direction is denoted by "brx". The blur amount of the panning direction brx is calculated by Equation 11 from the following degree fx of the panning direction and the exposure time t that was calculated in step S2354.

$$brx = \beta \times \tan(t \times |fx|) \quad (11)$$

In Equation 11, $\beta$ represents a blur conversion coefficient, and is the same value as both the horizontal component and the vertical component. tan( ) represents a tangent function, and |fx| represents an absolute value of fx. A similar calculation method is applied also with respect to the blur amount of the tilting direction (denoted by "bry"). The calculated blur amounts brx and bry are used as information for determining whether or not to execute image capturing.

Next, a blur direction will be explained. For example, with respect to subject blur, it is broadly classified into blur caused by a PT driving velocity being larger than the subject velocity with the subject as the reference, and a subject blur caused by a PT driving velocity being smaller than the subject velocity. With respect to a blur direction, in a case in which the subject is taken as a reference, it can be defined as a fast direction when the following degree fx is a positive value, and as a slow direction when the following degree fx is a negative value. After a blur direction is determined in step S2355, the processing proceeds to step S2356.

In step S2356 of FIG. 23, determination processing is executed with respect to whether or not to execute image capturing based on at least one or more of blur information, PT driving information, and shake amount of the image capturing apparatus that has been detected by the apparatus shake detection unit 208. The blur information is configured based on at least one or more of a blur amount, a blur direction, a distance between a subject among subject information and the image capturing apparatus, a direction of the subject, and a direction of the traveling direction of the subject. For example, determination processing is based on a comparison result between a blur amount calculated in step S2355, and a preset threshold value of the blur amount. In a case in which the blur amount is less than the threshold value, the control unit 212 determines to execute image capturing, and in a case in which the blur amount is equal to or greater than the threshold value, the control unit 212 determines not to execute image capturing. Alternatively, determination processing of detection accuracy is performed based on at least one or more of the distance between the subject and the image capturing apparatus, the orientation of the subject, and the direction in which the subject is traveling among the subject information. In this case, in a case in which the detection accuracy is lower than a threshold value, the control unit 212 determines that image capturing is not executed. Alternatively, based on the PT driving velocity, an exposure time t set in the electronic shutter control unit 213, and the movable range of the PT driving, determination processing is performed to determine whether or not the rotation unit reaches the driving end during exposure. In a case in which it is determined that the rotation unit reaches the driving end during exposure, the control unit 212 determines not to execute image capturing. Alternatively, the control unit 212 determines whether or not to execute image capturing based on a comparison result between the shake amount of the image capturing unit detected by the apparatus shake detection unit 208, and a predetermined threshold value. In a case in which the detected shake amount is less than the threshold value, the control unit 212 determines that image capturing is executed, and in a case in which the detected shake amount is greater than the threshold value, the control unit 212 determines that image capturing is not executed.

In a case in which the control unit 212 determines that image capturing is not executed (NO in step S2356 of FIG. 23), the processing proceeds to step S2357. The control unit 212 determines whether or not to change any one or more of the sensitivity of the following or exposure conditions based on at least one or more among the blur amount, the blur direction, the PT driving information, and the shake amount of the image capturing apparatus detected by the apparatus shake detection unit 208. In the determination processing, processing for predicting the movement of the subject is performed based on the blur amount and blur direction. For example, in a case in which the blur amount between a plurality of frames is equal to or greater than a threshold value and the blur direction frequently reverses (in a case in which the number of reversals in the blur direction is greater than a threshold value), the control unit 212 determines that the detected subject is an irregularly moving subject. Furthermore, in a case in which the blur. amount between a plurality of frames increases by a constant amount and the blur direction is constant, the control unit 212 determines that the detected subject is a moving subject having an acceleration component among subjects that move regularly.

Figure 26A:
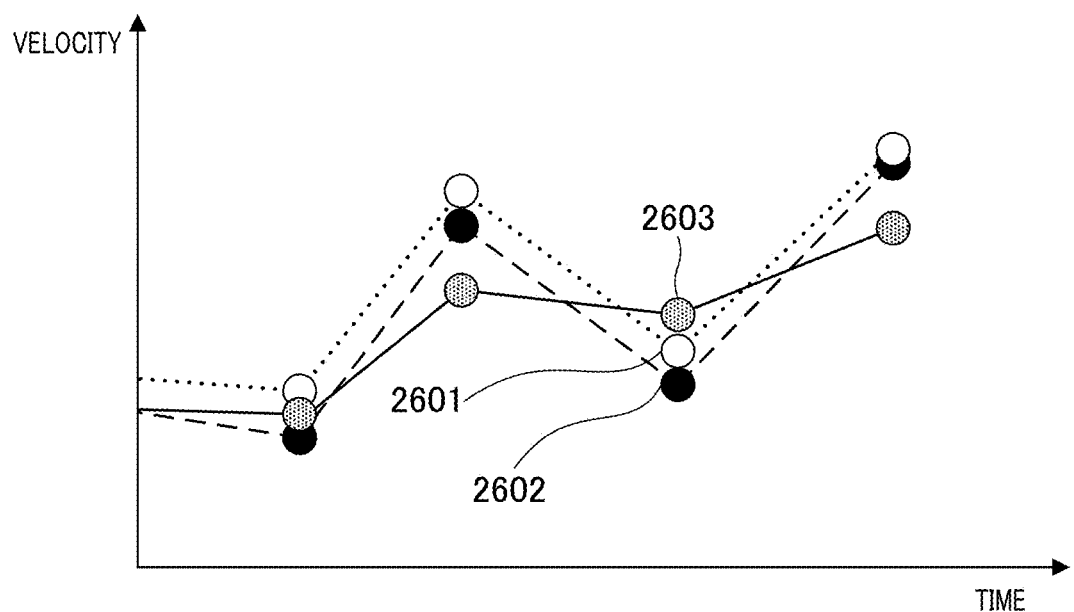
FIG. 26A and FIG. 26B are explanatory diagrams relating to calculation of the sensitivity of the following and an exposure condition.

Referring to FIG. 26, a method of changing the sensitivity of the following and exposure conditions in a case in which a subject is determined to be an irregularly moving subject will be explained. First, the sensitivity of the following will be explained with reference to FIG. 26A. FIG. 26A shows the subject velocity of the panning direction and the driving velocity of the pan rotation unit with respect to an irregularly moving subject. The horizontal axis is a time axis, and the vertical axis represents velocity. A time change of a subject velocity 2601 is shown by a dotted line graph. A time change of a driving velocity 2602 of a pan rotation unit having a high following sensitivity is shown by a dashed line graph. A time change of a driving velocity 2603 of a pan rotation unit having a low following sensitivity is shown by a solid line graph. Although when the sensitivity of following is high, responsiveness becomes high, but a hunting phenomenon may instead occur. In contrast, when the sensitivity of following is low, responsiveness becomes low, but a hunting phenomenon is less likely to occur.

Figure 26B:
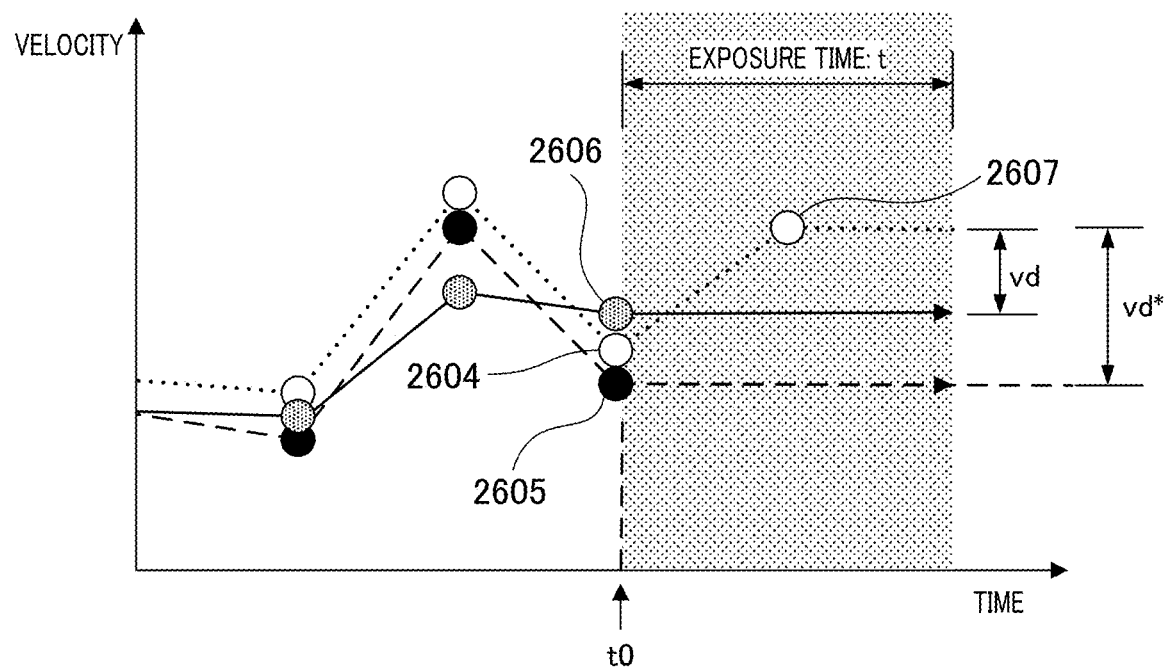

The sensitivity of following and a calculation method of exposure conditions will be explained with reference to FIG. 26B. FIG. 26B shows a time change of the subject velocity of the panning direction and a time change of the driving velocity of the pan rotation unit in a case in which it is determined that the subject is an irregularly moving subject based on the blur amount and blur direction. The settings with respect to the horizontal axis and the vertical axis are the same as those in FIG. 26A. t represents an exposure time, and t0 represents a time immediately before exposure. At time t0, each of a subject velocity 2604, a driving velocity 2605 of a pan rotation unit having a high sensitivity of following, and a driving velocity 2606 of a pan rotation unit having a low sensitivity of following are shown. In a period of exposure time t, a subject velocity 2607 is shown in a case in which a change in velocity occurs at a certain time. vd represents a velocity difference between the subject velocity 2607 and the driving velocity 2606 of a pan rotation unit having a lower sensitivity of following. vd* represents a velocity difference between the subject velocity 2607 and the driving velocity 2605 of a pan rotation unit having a high sensitivity of following.

As shown in FIG. 26B, the velocity difference vd* is greater than the velocity difference vd (|vd*|>|vd|). Furthermore, subject information cannot be acquired during the period of exposure time t (exposure period). For example, in a case in which the driving amount of the panning direction in the exposure period is calculated by the driving amount at time t0 immediately before the exposure, there is a possibility that erroneous following may be performed if the sensitivity of the following is too high. Therefore, in the present embodiment, control is performed during the exposure period so as to lower the sensitivity of the following than that at time t0, thereby enabling the reduction of the possibility of erroneous following. However, while it is possible to reduce the possibility of erroneous following, a velocity difference still exists between the subject velocity 2607 and the driving velocity 2606 of the pan rotation unit having a lower sensitivity of following (vd≠0), and subject blur may occur. Then, in a case in which a detected subject is determined to be an irregularly moving subject, the control unit 212 performs following control in which the sensitivity during an exposure period is lowered more than the sensitivity at time t0, and then performs control so as to change the exposure condition in a direction of shortening the exposure time t based on the blur amount.

Next, a change method of sensitivity of following and exposure conditions in a case in which a subject has been determined to move with an acceleration component among regularly moving subjects will be explained. When the subject moves with an acceleration component, the blur amount is increasing. Then, after the control unit 212 performs following control in which the sensitivity of following is raised higher than the sensitivity at time t0 in the exposure period, the control unit 212 then performs control to change the exposure condition in a direction to shorten the exposure time t based on the blur amount.

In the calculation processing of the sensitivity of following, the control unit 212 calculates sensitivity based on the subject velocity. For example, a sensitivity that has been previously associated with acceleration is used according to the acceleration that is calculated based on the current subject velocity and past subject velocity. Alternatively, the subject velocity may be replaced with the subject position, and the sensitivity calculated by the acceleration component, or the sensitivity may be calculated by replacing the subject velocity with a motion vector.

In the calculation processing of exposure conditions, the control unit 212 calculates an exposure time t by using the blur amount and a threshold value thereof, and determines the exposure conditions based on the calculation result. For example, the control unit 212 calculates an exposure time t so that a blur amount is kept within a threshold value based on the difference between the blur amount and the threshold value. Furthermore, the control unit 212 can determine the exposure time t based on the shake amount of the image capturing apparatus and the threshold value thereof. Alternatively, the control unit 212 can set the sensitivity setting of the following so as to stop the following, and calculate the exposure condition. In this case, an exposure condition is set so that the exposure time becomes shorter than the current exposure time t in order to suppress subject blur. Alternatively, the control unit 212 calculates the time from the current position to the point of arrival at the driving end position based on the distance from the current position of the pan rotation unit (or tilt rotation unit) to the driving end position calculated based on the PT driving information, and the subject velocity. In a case in which the calculated time is shorter than the current exposure time t, the control unit 212 sets the sensitivity of following so as to stop the following, and performs calculation processing of the exposure condition in the direction to suppress subject blur.

After calculation of the sensitivity of following and exposure conditions, in step S2357 of FIG. 23, change processing of a parameter according to the blur is executed. The control unit 212 uses the following sensitivity setting unit 1126 to set the sensitivity of following based on the calculation result in step S2356, and performs change and setting of exposure conditions with respect to the electronic shutter control unit 213. Thereafter, the automatic subject following and automatic image capturing processing is repeated by shifting to step S2351.

In a case in which it has been determined in step S2356 in FIG. 23 that image capturing is executed, the processing of steps S2358 and S2359 is performed. The exposure time in step S2359 is the exposure time t that is set in the electronic shutter control unit 213. After the completion of image capturing, the processing proceeds to step S2360, and similar to step S2354, the following degree of the panning direction and the tilting direction is calculated by using the subject information and the PT driving information. After image capturing, the following degree of the panning direction is denoted by "fx*", and the following degree of the tilting direction is denoted by "fy*".

Next, the processing of step S2361 (exposure period blur amount calculation) of FIG. 23 will be explained. The control unit 212 calculates a following degree fx of a panning direction before image capturing calculated at step S2354, and an exposure period blur amount ebrx of the panning direction by using the following degree fx* of the panning direction after the image capturing that was calculated at S2360 step. The calculation method of the exposure period blur amount will be explained with reference to FIG. 27.

Figure 27:
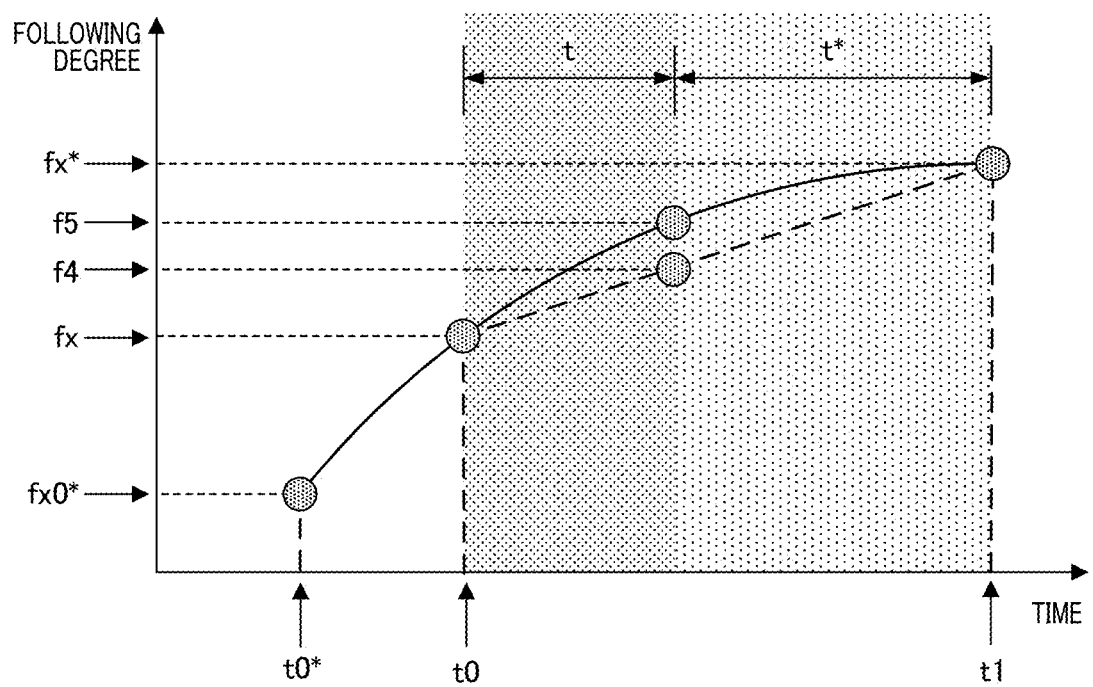
FIG. 27 is an explanatory diagram relating to a calculation of the exposure period blur amount.

FIG. 27 shows the time change of the following degree before and after image capturing. The horizontal axis is a time axis, and the vertical axis represents a following degree. From the calculated following degree (fx and fx*) before and after image capturing, processing is performed to convert the blur amount by predicting the following degree efx at the exposure time t. Time t0 indicates a time immediately before image capturing. An exposure time t and a signal readout time t* are shown. t* corresponds to the length of the readout period of the signal from the image capturing element. The period from the time t0 of immediately before image capturing to the time at which the exposure time t has elapsed corresponds to the exposure period. The time at which the signal readout time t* has elapsed from the time at which the exposure time t has elapsed is indicated by t1. Furthermore, a time earlier than the time t0 immediately before the exposure is indicated by t0*. Each following degree that is shown on the vertical axis is as follows.

fx*: Following degree at time t1.
f5: Following degree immediately after the elapse of exposure time t.
f4: Following degree immediately after the elapse of exposure time t obtained by linear interpolation.
fx: Following degree at time t0.
fx0*: Following degree at time t0*.

The exposure period blur amount ebrx of the panning direction is calculated by assuming a constant change in the following degree before and after image capturing. For example, f4 is calculated by linear interpolation processing with respect to a following degree fx at a time t0 immediately before image capturing, and a following degree fx* at a time t1 after image capturing. The following degree for calculating the exposure period blur amount ebrx is denoted by "efx". For example, the tracking degree efx is calculated by an averaging computation of the following degrees fx and f4 in an exposure period (within the exposure time t). Alternatively, the following degree efx can be calculated by assuming that the following degree has changed with an acceleration component before and after the image capturing. In that case, f5 indicates the following degree immediately after the elapse of exposure time t, which is calculated based on the following degree fx0* at time t0* which is earlier than time t0 immediately before the exposure, and the acceleration component between fx and fx*. Furthermore, the following degree efx can be calculated by a time integration computation based on fx and f5.

An exposure period blur amount ebrx of the panning direction is calculated from the following degree efx and the exposure time t by Equation 12.

$$ebrx = \beta \times \tan(t \times efx) \qquad (12)$$

The β in Equation 12 is a blur conversion factor, and is as explained in Equation 11. A calculation method of an exposure period blur amount ebrx of the panning direction has been explained above. However, an exposure period blur amount ebry of the tilting direction can be similarly calculated.

The control unit 212 compares the calculated exposure period blur amount with the threshold value of a blur amount that has been set in advance, and determines whether or not to store the image capturing data on a recording medium. In a case in which the exposure period blur amount is less than the threshold value, the image capture unit 207 stores the captured image data on a recording medium (step S2363 of FIG. 23). Processing to change the exposure conditions according to the set ISO sensitivity value is performed (step S2365 in FIG. 23). In contrast, in a case in which the calculated exposure period blur amount is equal to or greater than a threshold value, the control unit 212 does not store the image capturing image data on the recording medium or delete the image capturing image data (step S2364 in FIG. 23). The control unit 212 calculates a corrected PT driving amount to be used in the next image capturing based on the correction amount (step S2366 of FIG. 23).

In the conventional technology, in a case in which the following control or the like of a subject in an exposure period is performed by using information of immediately before exposure, image blur may occur in an image in which a subject that moves irregularly or the like is captured. In the present embodiment, processing is performed to change at least one of the sensitivity of following during the exposure period and the exposure conditions determined at least by one of the blur information obtained from the following degree of following control, the PT driving information, and the shake amount of the image capturing apparatus. In a case of image capturing of an irregularly moving subject or the like, it is possible to increase the opportunities to acquire an image in which image blurring has been suppressed.

Although an exemplary embodiment of the present invention has been described above, the present invention is not limited thereto, and can be variously modified and changed in the scope of the gist of the invention. Although the embodiment illustrated an image capturing apparatus having a driving mechanism unit of each rotation unit of the panning direction and tilting direction, the present invention can be applied to various image capturing apparatuses having a driving mechanism unit capable of changing the image capturing direction. Furthermore, as an image blur correction means, it is possible to use or combine a driving means of an optical member (shift lens and the like) that configures an image capturing optical system, or a driving means or the like that performs movement or rotation of an image capturing unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-93932, filed Jun. 9 2022, which is hereby incorporated by reference wherein in its entirety.

What is claimed is:

1. An image capturing apparatus comprising:
one or more processor and/or circuitry; and
at least one memory holding a program that makes the processor and/or the circuitry function as:
an image capturing unit configured to capture an image of a subject;
a first detection unit configured to detect subject information;
a second detection unit configured to detect a shake amount of the image capturing apparatus;
a driving unit configured to change an image capturing direction of the image capturing unit; and
a control unit configured to perform following control and image blur correction control that causes the driving unit to follow the image capturing direction with respect to the subject by using the subject information and the detection information of the shake amount, and control to change an exposure condition of the image capturing unit,
wherein the control unit is configured to calculate a control amount of the driving unit and driving information, and the following degree and sensitivity of the following control, and performs control so as to change at least one of the sensitivity and the exposure condition during an exposure period of the image capturing unit, which is determined by at least one of the blur information, the driving information, and the shake amount that is acquired from the following degree.

2. The image capturing apparatus according to claim 1, wherein by detection of a subject from an image that is acquired by the image capturing unit, the first detection unit is configured to acquire as the subject information, one or more pieces of information from among a velocity and a position of the subject, a motion vector around the subject, a distance between the subject and the image capturing apparatus, an orientation of the subject, and a traveling direction of the subject.

3. The image capturing apparatus according to claim 2, comprising a third detection unit configured to detect the driving information among one or more of a driving velocity, a driving position, and a movable range of the driving unit,
wherein the control unit is configured to perform the following control by using the driving information.

4. The image capturing apparatus according to claim 1, comprising a third detection unit configured to detect the driving information among one or more of a driving velocity, a driving position, and a movable range of the driving unit,
wherein the control unit is configured to perform the following control by using the driving information.

5. The image capturing apparatus according to claim 4, wherein the driving unit comprises:
a first driving unit configured to change the image capturing direction around a first rotation axis by performing driving of a first rotation unit among a plurality of rotation units, and
a second driving unit configured to change the image capturing direction around a second rotation axis by performing driving of a second rotation among the plurality of rotation units,
wherein the third detection unit is further configured to detect driving information of each of the first and second driving units.

6. The image capturing apparatus according to claim 5, wherein the control unit is configured to calculate a driving amount of the control unit from the control amount and sensitivity, and to determine the position of the rotation unit that corresponds to the driving amount.

7. The image capturing apparatus according to claim 1, wherein the control unit is further configured to calculate the following degree based on the subject information and the driving information.

8. The image capturing apparatus according to claim 1, wherein the control unit is further configured to acquire, as the blur information, one or more pieces of information among a blur amount of an image, a blur direction, a distance between the subject and the image capturing apparatus, an orientation of the subject, and a traveling direction of the subject.

9. The image capturing apparatus according to claim 1, wherein the control unit is further configured to calculate the following degree from the velocity of the subject and the driving velocity of the driving unit, and to calculate the blur information from the following degree and the exposure time of the image capturing unit.

10. The image capturing apparatus according to claim 1, wherein the control unit is further configured to determine whether or not to execute image capturing of the subject by a determination based on one or more among the blur information, the driving information, and the shake amount.

11. The image capturing apparatus according to claim 1, wherein the control unit is further configured to perform the following control in the exposure period by calculating the blur information from the following degree before image capturing and the exposure time of the image capturing unit.

12. The image capturing apparatus according to claim 1, further comprising a recording unit configured to record image data of the subject that is acquired by the image capturing unit on a recording medium,
wherein the control unit is further configured to calculate a blur amount of an image during the exposure period from a following degree during the exposure period that is calculated from the following degree before image capturing and the following degree after image capturing, and the exposure period of the image capturing unit, and compare the blur amount with a threshold value, and perform control to record the image data on the recording medium by the recording unit in a case in which the blur amount is equal to or less than the threshold value, or perform control so as to not to record the image data on the recording medium or to delete the image data from the recording medium in a case in which the blur amount is equal to or greater than the threshold value.

13. The image capturing apparatus according to claim 12, wherein the control unit is configured to determine that the subject is an irregularly moving subject in a case in which the blur amount between a plurality of frames is equal to or greater than a threshold value and the number of times the blur direction reverses is greater than a threshold value, and performs the following degree control by lowering the sensitivity during the exposure period to be lower than the sensitivity before image capturing.

14. The image capturing apparatus according to claim 13, wherein the control unit is further configured to perform control so as to change the exposure condition in a direction to make the exposure time shorter in a case in which it has been determined that the subject is an irregularly moving subject, or a subject that moves with an acceleration component among regularly moving subjects.

15. The image capturing apparatus according to claim 12, wherein the control unit is further configured to determine that the subject is a moving subject with an acceleration component among regularly moving subjects in a case in which the blur amount between a plurality of frames increases by a constant amount, and the blur direction is constant, and to perform the tracking control by increasing the sensitivity during the exposure period to be greater than the sensitivity before image capturing.

16. The image capturing apparatus according to claim 15, wherein the control unit is further configured to perform control so as to change the exposure condition in a direction to make the exposure time shorter in a case in which it has been determined that the subject is an irregularly moving subject, or a subject that moves with an acceleration component among regularly moving subjects.

17. A control method that is executed in an image capturing apparatus comprising an image capturing unit configured to capture an image of a subject, a driving unit configured to change an image capturing direction of the image capturing unit, and a control unit configured to control the driving unit, the method comprising:
a detection step of detecting subject information and a shake amount of the image capturing apparatus; and
a control step in which the control unit performs following control and image blur correction control that causes the driving unit to follow the image capturing direction with respect to the subject by using the subject information and the detection information of the shake amount, and control to change an exposure condition of the image capturing unit,
wherein in the control step, the control unit performs processing to calculate a control amount and driving information of the driving unit and a following degree and sensitivity of the following degree of the following control, and control to change to at least one of the sensitivity and exposure condition during the exposure period of the image capturing unit, which is determined by at least one of the blur information, the driving information, and the shake amount that is acquired from the following degree.

* * * * *